(12) United States Patent
Nishiyama et al.

(10) Patent No.: US 12,481,208 B2
(45) Date of Patent: Nov. 25, 2025

(54) IMAGE DISPLAY APPARATUS AND PROJECTION OPTICAL SYSTEM

(71) Applicant: SONY GROUP CORPORATION, Tokyo (JP)

(72) Inventors: Mariko Nishiyama, Kanagawa (JP); Jun Nishikawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 470 days.

(21) Appl. No.: 17/998,973

(22) PCT Filed: May 17, 2021

(86) PCT No.: PCT/JP2021/018550
§ 371 (c)(1),
(2) Date: Nov. 16, 2022

(87) PCT Pub. No.: WO2021/241297
PCT Pub. Date: Dec. 2, 2021

(65) Prior Publication Data
US 2023/0176463 A1  Jun. 8, 2023

(30) Foreign Application Priority Data

May 27, 2020 (JP) .................. 2020-091942

(51) Int. Cl.
*G03B 21/28* (2006.01)
*G02B 17/08* (2006.01)
*G03B 21/60* (2014.01)

(52) U.S. Cl.
CPC ......... *G03B 21/28* (2013.01); *G02B 17/0832* (2013.01); *G03B 21/60* (2013.01)

(58) Field of Classification Search
CPC ..... G03B 21/28; G02B 17/0832; G02B 13/16
See application file for complete search history.

(56) References Cited

U.S. PATENT DOCUMENTS

2007/0184368 A1  8/2007  Nishikawa et al.
2009/0231690 A1  9/2009  Nishikawa et al.
(Continued)

FOREIGN PATENT DOCUMENTS

CN  103959126 B  3/2017
CN  109791232 A  5/2019
(Continued)

OTHER PUBLICATIONS

International Search Report and Written Opinion prepared by the Japan Patent Office on Jul. 21, 2021, for International Application No. PCT/JP2021/018550, 5 pgs.

*Primary Examiner* — Ryan D Howard
(74) *Attorney, Agent, or Firm* — Sheridan Ross PC

(57) ABSTRACT

A projection optical system of an image display apparatus that includes a lens system and a concave reflection surface. The lens system is has a positive refractive power as a whole. The concave reflection surface reflects the image light emitted from the lens system toward an object. The projection optical system is configured such that a relationship $0<|\Delta\theta(hmax)\ \Delta\theta(0.9\cdot hmax)|/\theta(hmax)<0.056$ is satisfied, where a light beam height from the reference axis is h, an angle with respect to an optical axis height direction of a tangent line of a function Z(h) representing a shape of the concave reflection surface corresponding to the light beam height h is $\theta(h)$, an amount of change in the angle $\theta(h)$ is $\Delta\theta(h)$, and the light beam height h of a reflection point farthest from the reference axis of the concave reflection surface for reflecting the image light is hmax.

20 Claims, 35 Drawing Sheets

(56) References Cited

U.S. PATENT DOCUMENTS

| | | |
|---|---|---|
| 2011/0267687 A1 | 11/2011 | Kim et al. |
| 2014/0002802 A1 | 1/2014 | Hsu et al. |
| 2015/0293434 A1 | 10/2015 | Matsuo |
| 2017/0332057 A1 | 11/2017 | Matsuo |
| 2017/0363944 A1 | 12/2017 | Matsuo |
| 2018/0332257 A1 | 11/2018 | Matsuo |
| 2019/0129152 A1 | 5/2019 | Matsuo |
| 2019/0219905 A1 | 7/2019 | Nishikawa |
| 2019/0313064 A1 | 10/2019 | Matsuo |
| 2020/0142291 A1 | 5/2020 | Nishikawa |

FOREIGN PATENT DOCUMENTS

| | | |
|---|---|---|
| JP | 5365155 | 12/2013 |
| JP | 2015-031912 | 2/2015 |
| WO | WO 2006/043666 | 4/2006 |
| WO | WO 2009/107744 | 9/2009 |
| WO | WO 2014/103324 | 7/2014 |
| WO | WO 2016/017434 | 2/2016 |
| WO | WO 2016/068269 | 5/2016 |
| WO | WO 2017/188449 | 11/2017 |
| WO | WO 2018/042865 | 3/2018 |
| WO | WO 2018/117210 | 6/2018 |
| WO | WO 2019/012795 | 1/2019 |
| WO | WO 2019/146425 | 8/2019 |
| WO | WO 2019/216017 | 11/2019 |
| WO | WO 2020/004099 | 1/2020 |

| | |
|---|---|
| NA | 0.172 |
| Image modulation element (HxVSp) | 15.6 x 8.7 |
| Image modulation element center position (Chp) | 5.6 |
| Image circle (imc) on primary image plane side | 26.3 |

|   |   |   | Curvature radius | thickness | nd | vd |
|---|---|---|---:|---:|---:|---:|
|   |   | P | ∞ | 38.6 |  | 64 |
|   |   | 1 | ∞ | 46.4 | 1.517 | 25 |
|   |   | 2 | ∞ | 5.84 |  |  |
| L1 | F1 | 3 | 59.8 | 10.0 | 1.808 | 23 |
|   |   | 4 | -96.0 | 0.52 |  |  |
|   |   | 5 | 147.9 | 7.7 | 1.593 | 67 |
|   |   | 6 | -44.9 | 1.6 | 1.805 | 25 |
|   |   | 7 | 44.86 | 5.4 |  |  |
|   |   | 8 | -531.22 | 8.4 | 1.593 | 67 |
|   |   | 9 | -26.2 | 1.4 | 1.805 | 25 |
|   |   | 10 | -48 | 49.2 |  |  |
|   |   | 11 | 172.82 | 4.9 | 1.808 | 23 |
|   |   | 12 | -359.20 | 67.5 |  |  |
|   |   | 13 | -111.6 | 5.8 | 1.548 | 46 |
|   |   | 14 | -54.5 | 0.3 |  |  |
|   |   | 15 | 25.0 | 5.0 | 1.517 | 64 |
|   |   | 16 | 33.3 | 6.2 |  |  |
|   |   | 17 | -407.1 | 5.2 | 1.847 | 24 |
|   |   | 18 | 78.3 | 34.7 |  |  |
|   |   | 19 * | -7.4 | 5.5 | 1.583 | 59 |
|   | F2 | 20 * | -31.4 | 41.1 |  |  |
|   | Mr1 | 21 * | -28.9 | -81.3 | refl |  |
|   | Mr2 | 22 | 78.3 | 81.3 | refl |  |
| L2 |   | 23 * | -28.9 | 3.7 | 1.583 | 59 |
|   |   | 24 * | -35.0 | 15.6 |  |  |
|   |   | 25 | 178.4 | 6.7 | 1.648 | 34 |
|   |   | 26 | -71.4 | 4.9 |  |  |
|   |   | 27 | 274.9 | 2.5 | 1.847 | 24 |
|   |   | 28 | 32.1 | 3.6 |  |  |
|   |   | 29 | 105.3 | 3.4 | 1.593 | 67 |
|   |   | 30 | -70.9 | 11.9 |  |  |
|   |   | 31 | -118.8 | 5.9 | 1.593 | 67 |
|   | F5 | 32 | -36.2 | 181.5 |  |  |
|   | Mr3 | 33 * | -30.6 | -545.2 | refl |  |
|   |   | S | 1800.0 | 0.0 |  |  |

\* ··· (Aspherical surface)

| K: | -1.93E+00 | A2: | 0 | A3: | -8.71E-04 |
|---|---|---|---|---|---|
| A4: | 6.95E-04 | A5: | -1.11E-04 | A6: | 8.30E-06 |
| A7: | -1.93E-07 | A8: | -1.36E-08 | A9: | 8.74E-10 |
| A10: | 4.34E-12 | A11: | -1.44E-12 | A12: | 2.97E-14 |

S20

| K: | 0 | A2: | 0 | A3: | 0 |
|---|---|---|---|---|---|
| A4: | 2.61E-06 | A5: | 0 | A6: | -2.22E-08 |

S21

| K: | -1.65E+00 | A2: | 0 | A3: | 0.00E+00 |
|---|---|---|---|---|---|
| A4: | 1.25E-05 | A5: | 0 | A6: | -2.85E-08 |
| A7: | 0 | A8: | 3.27E-11 | A9: | 0 |
| A10: | -1.47E-14 | A11: | 0 | A12: | 0 |

S23

| K: | -1.65E+00 | A2: | 0 | A3: | 0 |
|---|---|---|---|---|---|
| A4: | 1.25E-05 | A5: | 0 | A6: | -2.85E-08 |
| A7: | 0 | A8: | 3.27E-11 | A9: | 0 |
| A10: | -1.47E-14 | A11: | 0 | A12: | 0 |

S24

| K: | 4.13E-01 | A2: | 0 | A3: | 0 |
|---|---|---|---|---|---|
| A4: | 3.45E-07 | A5: | 0 | A6: | 2.59E-08 |
| A7: | 0 | A8: | -4.31E-11 | A9: | 0 |
| A10: | 3.35E-14 | A11: | | A12: | 0 |

S33

| K: | -8.53E-01 | A2: | 0 | A3: | 7.33E-04 |
|---|---|---|---|---|---|
| A4: | -2.19E-05 | A5: | 1.83E-07 | A6: | 6.75E-09 |
| A7: | -1.82E-10 | A8: | 8.12E-13 | A9: | 1.32E-14 |
| A10: | 5.97E-17 | A11: | -3.98E-18 | A12: | 2.45E-20 |

FIG.18

| | |
|---|---|
| \| Δθ(hmax) - Δθ(0.9·hmax) \| / θ(hmax) | 0.001 |
| \| Φ1/Φ2 \| | 0.370 |
| \| A + B \| / C | 1.004 |

|   |   |   | Curvature radius | thickness | nd | vd |
|---|---|---|---|---|---|---|
|   |   | P | ∞ | 38.6 |   | 64 |
|   |   | 1 | ∞ | 46.4 | 1.517 | 25 |
|   |   | 2 | ∞ | 6.30 |   |   |
| L1 | F1 | 3 | 60.3 | 9.9 | 1.808 | 23 |
|   |   | 4 | -95.2 | 0.30 |   |   |
|   |   | 5 | 145.1 | 7.8 | 1.593 | 67 |
|   |   | 6 | -44.9 | 1.6 | 1.805 | 25 |
|   |   | 7 | 44.94 | 5.7 |   |   |
|   |   | 8 | -634.72 | 8.4 | 1.593 | 67 |
|   |   | 9 | -26.5 | 1.4 | 1.805 | 25 |
|   |   | 10 | -49 | 49.2 |   |   |
|   |   | 11 | 179.79 | 4.9 | 1.808 | 23 |
|   |   | 12 | -332.09 | 65.6 |   |   |
|   |   | 13 | -117.9 | 5.8 | 1.548 | 46 |
|   |   | 14 | -55.2 | 0.3 |   |   |
|   |   | 15 | 24.9 | 4.8 | 1.517 | 64 |
|   |   | 16 | 32.9 | 6.1 |   |   |
|   |   | 17 | -329.9 | 5.7 | 1.847 | 24 |
|   |   | 18 | 78.3 | 33.9 |   |   |
|   |   | 19 * | -8.1 | 6.2 | 1.583 | 59 |
|   | F2 | 20 * | -31.0 | 41.3 |   |   |
|   | Mr1 | 21 * | -27.9 | -81.3 | refl |   |
|   | Mr2 | 22 | 78.3 | 81.3 | refl |   |
| L2 |   | 23 * | -27.9 | 3.7 | 1.583 | 59 |
|   |   | 24 * | -35.2 | 16.8 |   |   |
|   |   | 25 | 146.7 | 6.8 | 1.648 | 34 |
|   |   | 26 | -71.5 | 4.8 |   |   |
|   |   | 27 | 278.3 | 1.5 | 1.847 | 24 |
|   |   | 28 | 31.7 | 3.5 |   |   |
|   |   | 29 | 85.4 | 3.8 | 1.593 | 67 |
|   |   | 30 | -70.9 | 12.1 |   |   |
|   |   | 31 | -104.4 | 6.0 | 1.593 | 67 |
|   | F5 | 32 | -36.8 | 182.1 |   |   |
|   | Mr3 | 33 * | -29.2 | -545.2 | refl |   |
|   |   | S | 1800.0 | 0.0 |   |   |

\* ··· (Aspherical surface)

| | | | | | |
|---|---:|---|---:|---|---:|
| K: | -1.90E+00 | A2: | 0 | A3: | -9.51E-04 |
| A4: | 7.03E-04 | A5: | -1.11E-04 | A6: | 8.29E-06 |
| A7: | -1.93E-07 | A8: | -1.36E-08 | A9: | 8.73E-10 |
| A10: | 4.36E-12 | A11: | -1.44E-12 | A12: | 2.96E-14 |

S20

| | | | | | |
|---|---:|---|---:|---|---:|
| K: | 0 | A2: | 0 | A3: | 0 |
| A4: | 4.10E-06 | A5: | 0 | A6: | -2.36E-08 |

S21

| | | | | | |
|---|---:|---|---:|---|---:|
| K: | -1.80E+00 | A2: | 0 | A3: | 0.00E+00 |
| A4: | 1.38E-05 | A5: | 0 | A6: | -3.22E-08 |
| A7: | 0 | A8: | 3.75E-11 | A9: | 0 |
| A10: | -1.69E-14 | A11: | 0 | A12: | 0 |

S23

| | | | | | |
|---|---:|---|---:|---|---:|
| K: | -1.80E+00 | A2: | 0 | A3: | 0 |
| A4: | 1.38E-05 | A5: | 0 | A6: | -3.22E-08 |
| A7: | 0 | A8: | 3.75E-11 | A9: | 0 |
| A10: | -1.69E-14 | A11: | 0 | A12: | 0 |

S24

| | | | | | |
|---|---:|---|---:|---|---:|
| K: | 4.14E-01 | A2: | 0 | A3: | 0 |
| A4: | -1.56E-07 | A5: | 0 | A6: | 2.85E-08 |
| A7: | 0 | A8: | -4.84E-11 | A9: | 0 |
| A10: | 3.64E-14 | A11: | 0 | A12: | 0 |

S33

| | | | | | |
|---|---:|---|---:|---|---:|
| K: | -8.49E-01 | A2: | 0 | A3: | 7.83E-04 |
| A4: | -2.31E-05 | A5: | 1.87E-07 | A6: | 6.99E-09 |
| A7: | -1.81E-10 | A8: | 7.60E-13 | A9: | 1.28E-14 |
| A10: | 6.74E-17 | A11: | -3.84E-18 | A12: | 2.28E-20 |

FIG.24

| | |
|---|---|
| NA | 0.172 |
| Image modulation element (HxVSp) | 16.6 x 8.3 |
| Image modulation element center position (Chp) | 5.6 |
| Image circle (imc) on primary image plane side | 26.3 |

FIG.29

|  |  | Curvature radius | thickness | nd | vd |
|---|---|---:|---:|---:|---:|
|  | P | ∞ | 38.6 |  | 64 |
|  | 1 | ∞ | 46.4 | 1.517 | 25 |
|  | 2 | ∞ | 5.64 |  |  |
| F1 | 3 | 68.2 | 9.3 | 1.808 | 23 |
|  | 4 | -134.3 | 5.50 |  |  |
|  | 5 | 90.9 | 10.1 | 1.593 | 67 |
|  | 6 | -49.5 | 1.5 | 1.805 | 25 |
|  | 7 | 49.54 | 4.2 |  |  |
|  | 8 | 510.53 | 7.5 | 1.593 | 67 |
|  | 9 | -30.9 | 1.2 | 1.805 | 25 |
|  | 10 | -58 | 95.8 |  |  |
| L1 | 11 | 71.74 | 4.3 | 1.808 | 23 |
|  | 12 | 161.86 | 51.4 |  |  |
|  | 13 | 35.8 | 5.1 | 1.487 | 70 |
|  | 14 | 47.0 | 3.4 |  |  |
|  | 15 | 30.1 | 6.1 | 1.487 | 70 |
|  | 16 | 47.3 | 6.5 |  |  |
|  | 17 | -454.7 | 4.0 | 1.847 | 24 |
|  | 18 | 78.5 | 31.3 |  |  |
|  | 19 * | -7.1 | 2.9 | 1.583 | 59 |
| F2 | 20 * | -80.4 | 47.8 |  |  |
| Mr1 | 21 * | -35.7 | -82.0 | refl |  |
| Mr2 | 22 | 78.5 | 82.0 | refl |  |
|  | 23 * | -35.7 | 3.0 | 1.583 | 59 |
|  | 24 * | -49.8 | 16.5 |  |  |
|  | 25 | 90.1 | 7.0 |  | 34 |
|  | 26 | -117.7 | 13.2 |  |  |
| L2 | 27 | 162.7 | 3.5 | 1.517 | 25 |
|  | 28 | 45.1 | 2.9 |  |  |
|  | 29 | 53.1 | 4.0 | 1.847 | 24 |
| F5 | 30 | -90.1 | 152.0 |  |  |
| Mr3 | 31 * | -97.8 | -694.7 | refl |  |
|  | S | ∞ | 0.0 |  |  |

\* ⋯ (Aspherical surface)

| | | | | | |
|---|---|---|---|---|---|
| K: | -2.28E+00 | A2: | 0 | A3: | 9.94E-04 |
| A4: | 4.18E-04 | A5: | -9.16E-05 | A6: | 7.38E-06 |
| A7: | -1.69E-07 | A8: | -1.30E-08 | A9: | 8.09E-10 |
| A10: | 2.66E-12 | A11: | -1.15E-12 | A12: | 2.27E-14 |

S20

| | | | | | |
|---|---|---|---|---|---|
| K: | 0 | A2: | 0 | A3: | 0 |
| A4: | -3.23E-05 | A5: | 0 | A6: | 1.72E-08 |

S21

| | | | | | |
|---|---|---|---|---|---|
| K: | -7.32E+00 | A2: | 0 | A3: | 0 |
| A4: | -7.42E-06 | A5: | 0 | A6: | 6.54E-09 |
| A7: | 0 | A8: | -4.91E-12 | A9: | 0 |
| A10: | 1.93E-15 | A11: | 0 | A12: | 0 |

S23

| | | | | | |
|---|---|---|---|---|---|
| K: | -7.32E+00 | A2: | 0 | A3: | 0 |
| A4: | -7.42E-06 | A5: | 0 | A6: | 6.54E-09 |
| A7: | 0 | A8: | -4.91E-12 | A9: | 0 |
| A10: | 1.93E-15 | A11: | 0 | A12: | 0 |

S24

| | | | | | |
|---|---|---|---|---|---|
| K: | 2.75E+00 | A2: | 0 | A3: | 0 |
| A4: | -5.47E-06 | A5: | 0 | A6: | 2.93E-08 |
| A7: | 0 | A8: | -4.60E-11 | A9: | 0 |
| A10: | 4.37E-14 | A11: | 0 | A12: | 0 |

S31

| | | | | | |
|---|---|---|---|---|---|
| K: | -8.36E-01 | A2: | 0 | A3: | 0 |
| A4: | -1.98E-06 | A5: | 0 | A6: | 4.70E-10 |
| A7: | 0 | A8: | -5.52E-14 | A9: | 0 |
| A10: | 2.60E-18 | A11: | 0 | A12: | 0 |

FIG.31

| | |
|---|---|
| $\|\Delta\theta(hmax) - \Delta\theta(0.9 \cdot hmax)\| / \theta(hmax)$ | 0.002 |
| $\|\Phi 1/\Phi 2\|$ | 0.455 |
| $\|A + B\| / C$ | 0.972 |

| | |
|---:|:---:|
| NA | 0.207 |
| Image modulation element (HxVSp) | 8.2 x 4.6 |
| Image modulation element center position (Chp) | 4.0 |
| Image circle (imc) on primary image plane side | 7.8 |

FIG.36

|   |   | Curvature radius | thickness | nd | vd |
|---|---|---|---|---|---|
|   | P | ∞ | 4.1 |   |   |
|   | 1 | ∞ | 4.0 | 1.517 | 64 |
|   | 2 | ∞ | 13.8 | 1.805 | 25 |
|   | 3 | ∞ | 2.00 |   |   |
| F1 | 4 | 23.7 | 5.0 | 1.755 | 28 |
|   | 5 | -47.0 | 0.20 |   |   |
|   | 6 | 16.4 | 6.7 | 1.593 | 67 |
|   | 7 | -16.4 | 0.9 | 1.847 | 24 |
|   | 8 | 16.38 | 2.4 |   |   |
|   | 9 | 75.54 | 2.8 | 1.593 | 67 |
| L1 | 10 | -22.1 | 10.0 |   |   |
|   | 11 | 21 | 1.7 | 1.808 | 23 |
|   | 12 | 130.66 | 0.2 |   |   |
|   | 13 | 12.87 | 3.5 | 1.648 | 34 |
|   | 14 | -15.0 | 2.0 | 1.847 | 24 |
|   | 15 | 30.9 | 11.8 |   |   |
|   | 16 * | -3.2 | 1.3 | 1.522 | 56 |
| F2 | 17 * | 2.5 | 23.3 |   |   |
| Mr1 | 18 * | -21.6 | -36.4 | refl |   |
| Mr2 | 19 | 30.9 | 36.4 | refl |   |
|   | 20 * | -21.6 | 1.5 | 1.583 | 59 |
|   | 21 * | -27.9 | 4.2 |   |   |
|   | 22 | -37.4 | 2.9 | 1.67003 | 47 |
|   | 23 | -17.6 | 3.7 |   |   |
| L2 | 24 | -73.7 | 0.8 | 1.847 | 24 |
|   | 25 | 41.6 | 2.7 |   |   |
|   | 26 | 25.0 | 2.6 | 1.593 | 67 |
| F5 | 27 | -53.4 | 65.0 |   |   |
| Mr3 | 28 * | -22.5 | -200.5 | refl |   |
|   | S | ∞ | 0.0 |   |   |

*  ··· (Aspherical surface)

| | | | | | |
|---|---|---|---|---|---|
| K: | -1.27E+00 | A2: | -4.01E-01 | A3: | 2.53E-01 |
| A4: | -5.71E-02 | A5: | 5.47E-03 | A6: | 2.05E-04 |
| A7: | -7.78E-05 | A8: | -3.21E-07 | A9: | 8.69E-07 |
| A10: | 6.16E-09 | A11: | -1.04E-08 | A12: | 5.38E-10 |

S17

| | | | | | |
|---|---|---|---|---|---|
| K: | -4.35E+00 | A2: | -5.68E-01 | A3: | 0 |
| A4: | -6.33E-02 | A5: | 8.39E-03 | A6: | -4.66E-04 |
| A7: | -1.66E-06 | A8: | -3.64E-06 | A9: | 1.14E-06 |
| A10: | -9.91E-08 | A11: | 2.53E-09 | A12: | 2.69E-11 |

S18

| | | | | | |
|---|---|---|---|---|---|
| K: | -2.70E+00 | A2: | 0 | A3: | -1.53E-03 |
| A4: | 4.15E-04 | A5: | -6.45E-05 | A6: | 5.57E-06 |
| A7: | -2.79E-07 | A8: | 7.13E-09 | A9: | -4.70E-11 |
| A10: | -9.57E-13 | A11: | 0 | A12: | 0 |

S20

| | | | | | |
|---|---|---|---|---|---|
| K: | -2.70E+00 | A2: | 0 | A3: | -1.53E-03 |
| A4: | 4.15E-04 | A5: | -6.45E-05 | A6: | 5.57E-06 |
| A7: | -2.79E-07 | A8: | 7.13E-09 | A9: | -4.70E-11 |
| A10: | -9.57E-13 | A11: | 0 | A12: | 0 |

S21

| | | | | | |
|---|---|---|---|---|---|
| K: | 0 | A2: | 0 | A3: | -2.79E-03 |
| A4: | 5.45E-04 | A5: | -5.27E-05 | A6: | 2.01E-06 |
| A7: | 1.79E-07 | A8: | -1.75E-08 | A9: | -2.05E-09 |
| A10: | 4.78E-10 | A11: | -3.22E-11 | A12: | 7.29E-13 |

S27

| | | | | | |
|---|---|---|---|---|---|
| K: | -4.76E+00 | A2: | 0 | A3: | 2.12E-03 |
| A4: | -2.39E-04 | A5: | 0 | A6: | -4.72E-09 |
| A7: | -3.37E-09 | A8: | -2.52E-11 | A9: | 2.79E-12 |
| A10: | 7.57E-15 | A11: | -1.86E-15 | A12: | 2.39E-17 |

FIG.38

IMAGE DISPLAY APPARATUS AND PROJECTION OPTICAL SYSTEM

CROSS REFERENCE TO RELATED APPLICATIONS

This application is a national stage application under 35 U.S.C. 371 and claims the benefit of PCT Application No. PCT/JP2021/018550, having an international filing date of 17 May 2021, which designated the United States, which PCT application claimed the benefit of Japanese Patent Application No. 2020-091942, filed 27 May 2020, the entire disclosures of each of which are incorporated herein by reference.

TECHNICAL FIELD

The present technology relates to an image display apparatus and a projection optical system such as a projector.

In the related art, a projector has been widely known as a projection type image display apparatus for displaying a projection image on a screen. Recently, there has been an increasing demand for an ultra-wide angle front-projection type projector that is capable of displaying a large screen even on a small projection space. By using this projector, a large screen can be projected in a limited space by performing projection obliquely and at a wide angle with respect to a screen.

In an ultra-wide angle projection type projector described in Patent Literature 1, by moving a part of optical components included in a projection optical system, a screen shift for moving a projection image projected on s screen can be performed. A fine adjustment of an image position and the like can be easily carried out by using this screen shift (see paragraphs [0023] and [0024] in the specification of Patent Literature 1).

CITATION LIST

Patent Literature

Patent Literature 1: Japanese Patent No. 5365155

DISCLOSURE OF INVENTION

Technical Problem

Projectors compatible with an ultra-wide angle will continue to become popular in the future, and a technology capable of realizing a high-quality image display is necessary.

In view of the above circumstances, an object of the present technology is to provide an image display apparatus and a projection optical system compatible with an ultra-wide angle and capable of realizing a high-quality image display.

Solution to Problem

In order to achieve the above-mentioned object, an image display apparatus according to an embodiment of the present technology includes a light source, an image generation unit, and a projection optical system.

The image generation unit generates image light by modulating light emitted from the light source.

The projection optical system includes a lens system and a concave reflection surface.

The lens system is configured with reference to a reference axis at a position where the generated image light is incident and has a positive refractive power as a whole.

The concave reflection surface is configured with reference to the reference axis and reflects the image light emitted from the lens system toward an object to be projected.

The image display apparatus is configured such that a relationship $$0 < |\Delta\theta(h\ max) - \Delta\theta(0.9 \cdot h\ max)|/\theta(h\ max) < 0.056$$

is satisfied if
  a light beam height from the reference axis is denoted as h,
  an angle with respect to an optical axis height direction of a tangent line of a function Z(h) representing a shape of the concave reflection surface corresponding to the light beam height h is denoted as $\theta(h)$,
  an amount of change in the angle $\theta(h)$ at the light beam height h is denoted as $\Delta\theta(h)$, and
  the light beam height h of a reflection point farthest from the reference axis of the concave reflection surface for reflecting the image light is denoted as hmax.

In the image display apparatus, the shape of the concave reflecting surface for reflecting the image light toward the projected object is designed as described above. This makes it possible to display a high-quality image.

The $\Delta\theta(h)$ may be $\theta(h) - \theta(0.98 \cdot h)$.

If light beams of the image light included in a region having a reflection point reflected by the concave reflection surface of larger than $0.85 \cdot hmax$ are denoted as edge side light beams, the projection optical system may be configured such that the traveling directions of each of the edge side light beams incident on the concave reflection surface are parallel to each other.

The projection optical system may be configured such that light beam spaces of the edge side light beams incident on the concave reflection surface are equal.

The lens system may have a first refractive optical system, a first reflection surface, a second reflection surface, and a second reflection surface.

The first refractive optical system has a positive refractive power as a whole and refracts the image light generated.

The first reflection surface reflects back the image light refracted by the first refractive optical system.

The second reflection surface reflects back the image light reflected by the first reflection surface.

The second refractive optical system has a positive refractive power as a whole and refracts the image light reflected by the second reflection surface to emit to the concave reflection surface.

The image display apparatus may be configured such that a relationship $$0.1 < |\Phi 2/\Phi 1| < 1.2$$

is satisfied if
  a power of the first reflection surface is denoted as $\Phi 1$, and
  a power of the second reflection surface is denoted as $\Phi 2$.

The image display apparatus may be configured such that a relationship $$|\Phi 2| < |\Phi 1|$$

may be satisfied.

In the image display apparatus,
  if the first refractive optical system, the first reflection surface, and the second reflection surface are denoted as a first optical system, and a portion acting on the edge side light beams of the second refractive optical system is denoted as a second optical system, the first optical system may condense the edge side light beams on a predetermined condensing position. The predetermined condensing position may coincide with a front focus position of the second optical system.

The image display apparatus may be configured such that a relationship $$0.8 < |A+B|/C < 1.2$$

may be satisfied if among the edge side light beams, a light beam having the light beam height at the reflection point reflected by the concave reflection surface being an intermediate value is denoted as an intermediate light beam, an incident position of the intermediate light beam with respect to a final lens surface of the second refractive optical system is denoted as an intermediate incident position, an optical path length of the intermediate light beam from the image generation unit to the predetermined condensing position is denoted as A, an optical path length from the intermediate incident position to the front focus position is denoted as B, and an optical path length of the intermediate light beam from the image generation unit to the intermediate incident position is denoted as C.

If an average value of an angle in which each traveling direction of the edge side light beams incident on the concave reflection surface and a direction along the reference axis are intersected is denoted as an average angle, and a region on which the edge side light beams are incident of the final lens surface of the second refractive optical system is denoted as an edge side incident region, the front focus position of the second optical system may be a condensing position when a parallel beam is incident on the edge side incident region of the final lens surface from an opposite side along the direction intersecting at the average angle with respect to the direction along the reference axis.

The optical path length B may be an optical path length of the light beam traveling from the intermediate incident position to the back focus position if the parallel light beam is incident on the edge side incident region of the final lens surface from an opposite side.

The concave reflection surface may reflect at least a portion of the light beams included in the image light incident on the concave reflection surface in a direction intersecting at an angle of 90 degrees or more with a direction along the reference axis.

The projection optical system may include a first optical component where one region of a main surface is configured as the first reflection surface and the other region of the main surface is configured as a transmission surface. In this case, the transmission surface of the first optical component may function as the second refractive optical system.

The projection optical system may include a second optical component where one region of a main surface is configured as the second reflection surface and the other region of the main surface is configured as a transmission surface. In this case, the transmission surface of the second optical component may function as the first refractive optical system.

The reference axis may be an axis obtained by extending an optical axis of a lens closest to the image generation unit included in the lens system.

The projection optical system may be configured such that an optical axis of each of all optical components included in the projection optical system coincides with a predetermined reference axis.

The concave reflection surface may be configured such that a rotational symmetrical axis coincides with the reference axis. In this case, each of the first reflection surface and the second reflection surface is a concave reflection surface and is configured such that the rotational symmetrical axis coincides with the reference axis.

Each of the concave reflection surface, the first reflection surface, and the second reflection surface may be configured such that an optical axis coincides with the reference axis. In this case, at least one of the concave reflection surface, the first reflection surface, or the second reflection surface may be a free curved surface having no rotational symmetrical axis.

The object to be projected may be a flat screen or a curved screen.

The projection object may be a screen having a dome shape.

A projection optical system according to an embodiment of the present technology is for projecting image light generated by modulating light emitted from a light source and includes the lens system; and the concave reflection surface.

BRIEF DESCRIPTION OF DRAWINGS

FIG. 17 is lens data of the image display apparatus.

FIG. 18 is a table showing an example of aspherical coefficients of optical components included in the projection optical system.

FIG. 23 is lens data of the image display apparatus.

FIG. 24 is a table showing an example of aspherical coefficients of the optical components included in the projection optical system.

FIG. 29 is a table showing an example of the parameters relating to the image projection.

FIG. 30 shows lens data of the image display apparatus.

FIG. 31 is a table showing an example of aspherical coefficients of the optical components included in the projection optical system.

FIG. 36 is a table showing an example of the parameters relating to the image projection.

FIG. 37 shows lens data of the image display apparatus.

FIG. 38 is a table showing an example of aspherical coefficients of the optical components included in the projection optical system.

MODE(S) FOR CARRYING OUT THE INVENTION

Hereinafter, embodiments according to the present technology will be described with reference to the drawings.

[Outline of Projection Type Image Display Apparatus]

An outline of a projection type image display apparatus will be briefly described by taking a liquid crystal projector as an example.

The liquid crystal projector spatially modulates light irradiated from a light source to form an optical image (image light) corresponding to a video signal.

For the modulation of the light, a liquid crystal display element or the like is used as an image modulation element. For example, a three-plate liquid crystal projector including a panel-shaped liquid crystal display element (liquid crystal panel) corresponding to each of RGB is used.

The optical image is magnified and projected by a projection optical system and displayed on a screen. Here, the projection optical system will be described as compatible with an ultra-wide angle having, for example, a half view angle of 70° or more. It should be appreciated that the angle is not limited to this angle.

In the liquid crystal projector compatible with the ultra-wide angle, a large screen can be displayed even in a small projection space. That is, even in a case where a distance between the liquid crystal projector and the screen is short, a magnified projection is possible.

As a result, the following advantages are exhibited.

Since the liquid crystal projector can be disposed close to the screen, it is possible to sufficiently reduce a possibility of direct entry of light from the liquid crystal projector into human eyes and to achieve a higher degree of safety.

Since the screen does not show a shadow of a person or the like, an efficient presentation is possible.

A degree of freedom of selecting an installation site is high, and it can be easily installed on a ceiling or the like where is a narrow installation space and includes many obstacles.

By using it installed on a wall, it is easy to perform maintenance such as routing of a cable as compared with the case of installing it on the ceiling.

For example, it is possible to increase the degree of freedom of setting a meeting space, a classroom, a conference room, and the like.

Figure 1:
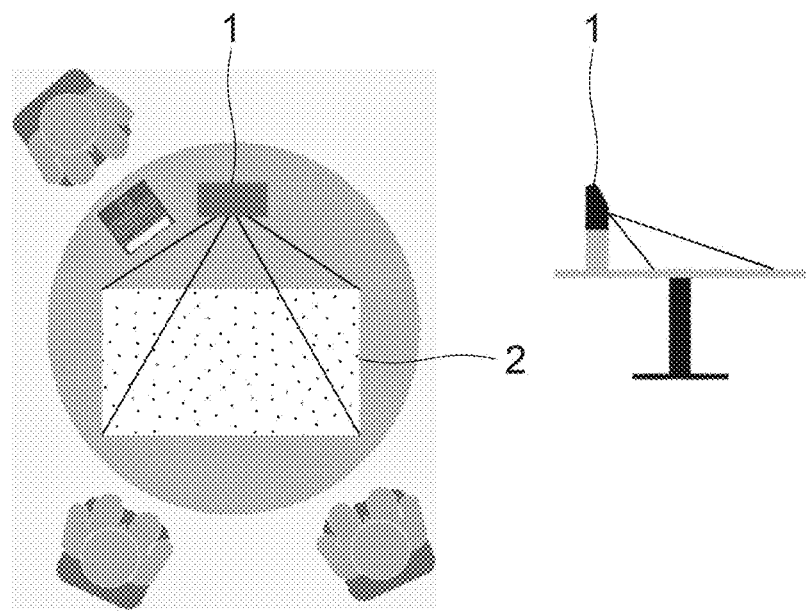
FIG. 1 is a schematic diagram for describing other advantages of a liquid crystal projector compatible with an ultrawide angle.

FIG. 1 is a schematic diagram for describing other advantages of the liquid crystal projector compatible with the ultra-wide angle.

As shown in FIG. 1, by installing a liquid crystal projector 1 compatible with the ultra-wide angle on a table, a magnified image 2 can be projected onto the same table.

Such a use is also possible, and a space can be efficiently used.

Recently, with a widespread use of an electronic blackboard (Interactive White Board) and the like in schools, workplaces, and the like, there has been an increasing demand for the liquid crystal projector compatible with the ultra-wide angle. Furthermore, a similar liquid crystal projector is also used in the field of digital signage (electronic advertising) and the like.

For example, a technique including an LCD (Liquid Crystal Display) and a PDP (Plasma Display Panel) can be used as the electronic blackboard. As compared with the technology, by using the liquid crystal projector compatible with the ultra-wide angle, it is possible to provide a large screen with reduced costs.

Note that the liquid crystal projector compatible with the ultra-wide angle is referred to also as a short focus projector, an ultra short focus projector, or the like.

Figure 2:
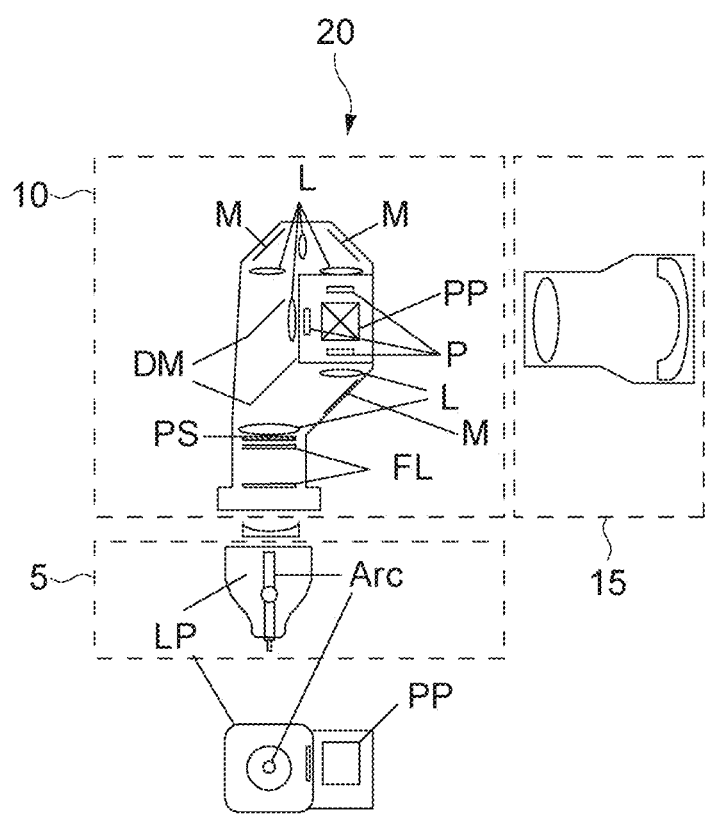
FIG. 2 is a schematic diagram showing a configuration example of a projection type image display apparatus.

FIG. 2 is a schematic diagram showing a configuration example of a projection type image display apparatus.

An image display apparatus 20 includes a light source 5, a lighting optical system 10, and a projection optical system 15.

The light source 5 is disposed to emit a light beam to the lighting optical system 10.

As the light source 5, a high-pressure mercury lamp or the like is used, for example. Alternatively, a solid-state light source such as an LED (Light Emitting Diode) and an LD (Laser Diode) may be used.

The lighting optical system 10 uniformly irradiates a light beam emitted from the light source 5 onto a surface of the image modulation element (liquid crystal panel P) serving as a primary image plane.

In the lighting optical system 10, the light beam from the light source 5 passes through two fly-eye lenses FL, a polarization conversion element PS, and a condenser lens L in this order, and is converted into a uniform light beam of polarized light.

The light beam passed through the condenser lens L is separated into light of each RGB color component by a dichroic mirror DM that reflects only light in a particular wavelength band.

The light of each RGB color component is incident on the liquid crystal panel P (image modulation element) provided corresponding to each RGB color via a total reflection mirror M, the lens L, and the like. Then, optical modulation corresponding to the video signal is performed by each liquid crystal panel P.

Each color component light optically modulated is combined by a dichroic prism PP to generate the image light. The generated image light is emitted toward the projection optical system 15.

Optical components and the like constituting the lighting optical system 10 are not limited, and optical components different from the optical components described above may be used.

For example, as the image modulation element, a reflective-type liquid crystal panel, a digital micromirror device (DMD), or the like may be used instead of a transmission-type liquid crystal panel P.

Furthermore, for example, a polarizing beam splitter (PBS), a color composite prism that combines the video signal of each RGB color, a TIR (Total Internal Reflection) prism, or the like may be used instead of the dichroic prism PP.

In the present embodiment, the lighting optical system 10 corresponds to the image generation unit.

The projection optical system 15 adjusts the image light emitted from the lighting optical system 10 and magnifies and projects the image light onto a screen serving as a secondary image plane. That is, image information of the primary image plane (liquid crystal panel P) is adjusted by the projection optical system 15 and is magnified and projected onto the secondary image plane (screen).

First Embodiment

[Image Display System]

Figure 3:
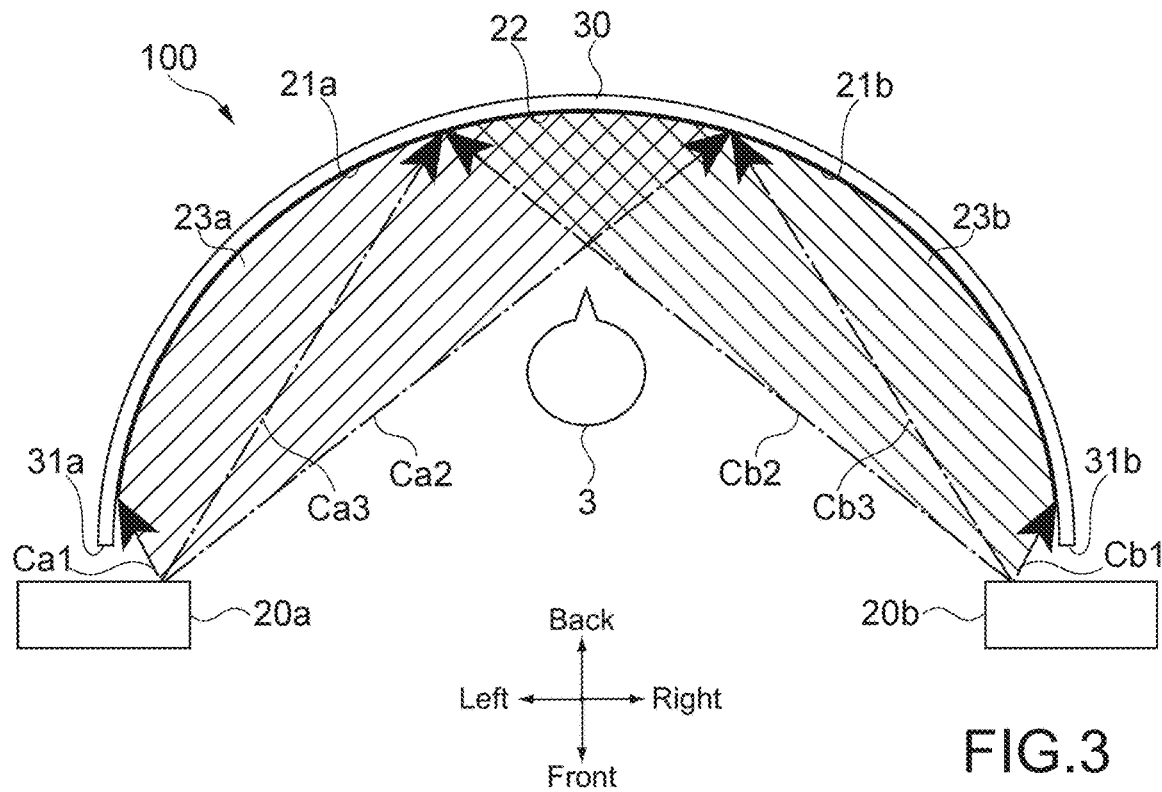
FIG. 3 is a schematic diagram showing a configuration example of an image display system according to a first embodiment of the present technology.
Figure 4:
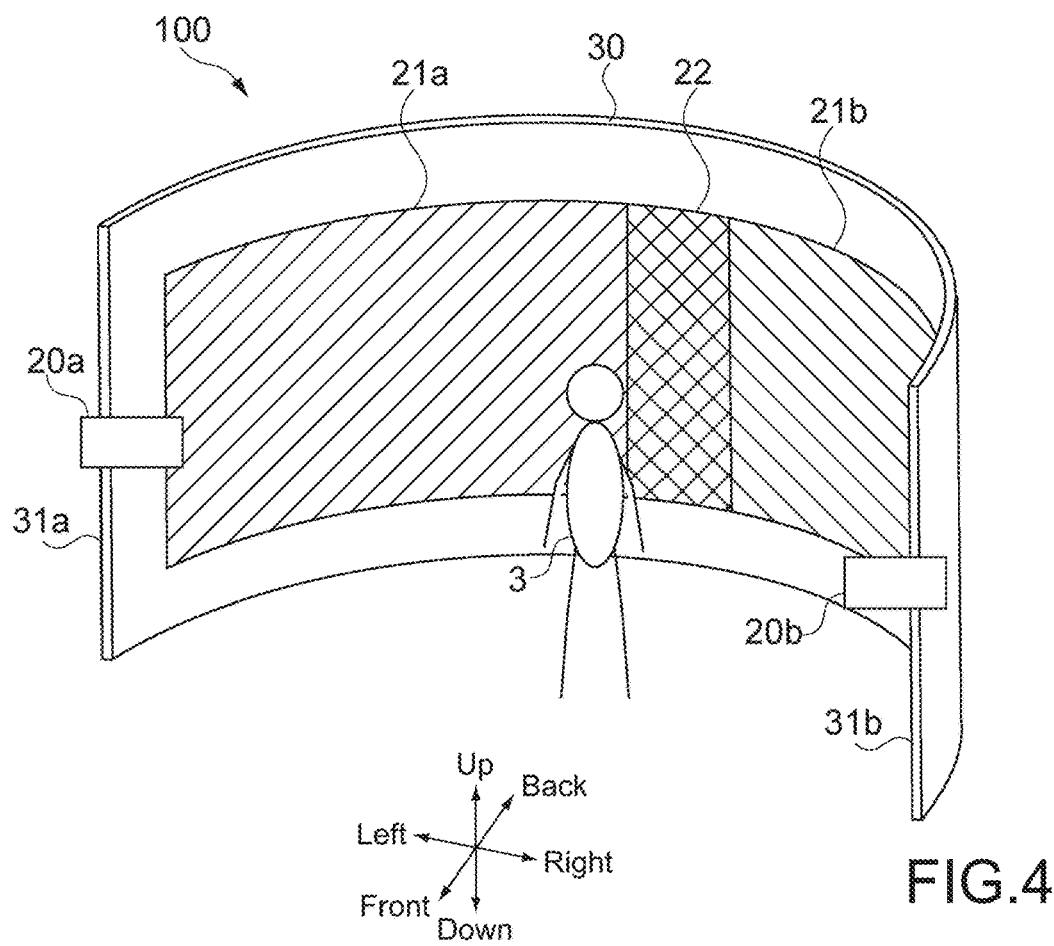
FIG. 4 is a schematic diagram showing the configuration example of the image display system according to the first embodiment of the present technology.

FIGS. 3 and 4 are schematic diagrams showing a configuration example of an image display system according to a first embodiment of the present technology.

FIG. 3 is the diagram viewed from above of the image display system 100.

FIG. 4 is the diagram viewed obliquely from above at right front side of the image display system 100.

The image display system 100 includes a curved screen 30 and two image display apparatuses 20.

The curved screen 30 includes both a screen in which an overall shape becomes a curved shape and a screen in which at least a portion of a shape becomes a curved shape.

As shown in FIGS. 3 and 4, in the present embodiment, the curved screen 30 having an approximately arc shape as viewed from above is used. The curved screen 30 is installed so as to be erected along the up-down direction and to extend in the left-right direction.

Left and right end portions 31a and 31b of the curved screen 30 are bent to the front side and are arranged at approximately equal positions in the front-back direction. An approximately center portion in the left-right direction of the curved screen 30 is located on a backmost side and is a portion corresponding to an apex of the approximately arc shape as viewed from above.

It is also possible to express the shape of the curved screen 30 as a shape that is approximately equal to a portion of an inner surface of a cylinder erected along the up-down direction. Furthermore, the curved screen 30 may be configured by connecting minute flat regions while changing angles to each other.

Specific configurations such as a material, a size, a curvature radius, etc. of the curved screen 30 are not limited and may be arbitrarily designed. In addition, the curved screen 30 may be realized by bonding a flexible screen member to an inner surface of a base member having an arc shape when viewed from above.

In the present embodiment, the curved screen 30 corresponds to an object to be projected.

The two image display apparatuses 20 include a first image display apparatus 20a and a second image display apparatus 20b.

The first image display apparatus 20a is installed at the approximately center portion in the up-down direction of a left end portion 31a of the curved screen 30 so as to be able to project an image toward the back. The first image display apparatus 20a projects an image (hereinafter, referred to as first image) 21a on the left side of the curved screen 30 bent in the approximately arc shape.

The second image display apparatus 20b is installed at the approximately center portion in the up-down direction of a right end portion 31b of the curved screen 30 so as to be able to project an image toward the back. The second image display apparatus 20b projects an image (hereinafter, referred to as second image) 21b on the right side of the curved screen 30 bent in the approximately arc shape.

As shown in FIGS. 3 and 4, the first and second image display apparatuses 20a and 20b project the first and second images 21a and 21b, respectively, such that the first and second images 21a and 21b overlap each other.

Holding mechanisms (not shown) for holding the first and second image display apparatuses 20a and 20b may be arbitrarily designed.

In the present embodiment, the image modulation element (liquid crystal panel P) provided in each of the first and second image display apparatuses 20a and 20b is made of a rectangular shape having a long side direction and a short side direction. The liquid crystal panel P generates the image light forming a rectangular image.

The first and second images 21a and 21b are projected as the rectangular images equal to each other. The first and second images 21a and 21b are projected so as to overlap each other along the long side direction (left and right direction) of the first and second images 21a and 21b.

Accordingly, an overlapping region 22 in which the first and second images 21a and 21b overlap with each other is generated at the approximately center portion of the curved screen 30.

In the present embodiment, a stitching process is performed in the overlapping region 22 where the first and second images 21a and 21b overlap.

Thus, the first and second images 21a and 21b are connected and combined as one image. As a result, one image having a large size is displayed in an approximately entire region along the left-right direction of the curved screen 30.

Specific algorithms and the like of the stitching process are not limited, and any stitching technique may be used.

In FIG. 3, first image light 23a constituting a first image 21a projected from the first image displaying apparatus 20a and pixel lights Ca1, Ca2, and Ca3 included in the first image light 23a are schematically shown.

Also, in FIG. 3, first image light 23b constituting a second image 21b projected from the second image display apparatus 20b and pixel lights Cb1, Cb2, and Cb3 included in the second image light 23b are schematically shown.

Note that the pixel light is light for constituting each of a plurality of pixels included in a projection image. Typically, light emitted from each of the plurality of pixels included in the image modulating element (liquid crystal panel P) for generating and emitting image light is the pixel light. Accordingly, the image light includes the plurality of pixel lights.

The pixel light Ca1 shown in FIG. 3 is pixel light for constituting a pixel at a left end portion of the first image 21a. Therefore, the pixel light Ca1 corresponds to a light beam at a left end portion of the first image light 23a.

The pixel light Ca2 is pixel light for constituting a pixel at a right end portion of the first image 21a. Therefore, the pixel light Ca2 corresponds to a light beam at a right end portion of the first image light 23a.

The pixel light Ca3 is pixel light for constituting a pixel at a left end portion of the overlapping region 22 in which the first and second images 21a and 21b overlap.

Therefore, among the light beams included in the first image light 23a, the light beams from the pixel lights Ca3 to Ca2 are image lights constituting the overlapping region 22.

On the other hand, among the light beams included in the first image light 23a, the light beams from the pixel lights Ca1 to Ca3 are image lights constituting a region other than the overlapping region 22.

The pixel light Cb1 shown in FIG. 3 is pixel light for constituting the pixel at a right end portion of the second image 21b. Therefore, the pixel light Cb1 corresponds to the light beam at a right end portion of the second image light 23b.

The pixel light Cb2 is pixel light for constituting the pixel of a left end portion of the second image 21b. Therefore, the pixel light Cb2 corresponds to the light beam at the left end portion of the first image light 23a.

The pixel light Ca3 is a pixel light for constituting the pixel of a right end portion of the overlapping region 22.

Therefore, among the light beams included in the second b, the light beams from the pixel light Cb3 to Cb2 is an image light constituting the overlapping region 22.

On the other hand, among the light beams included in the second image light 23b, the light beams from the pixel light Cb1 to Cb3 are image lights constituting a region other than the overlapping region 22.

As shown in FIG. 3, in the present embodiment, the first and second image display apparatuses 20a and 20b project the first and second images 21a and 21b, respectively, such that the image lights constituting the regions other than the overlapping region 22 in which the first and second images 21a and 21b overlap each other do not intersect each other.

Thus, it is possible to sufficiently suppress a shadow generation of a user 3 standing at a position close to the overlapping region 22 generated in the approximately center portion of the curved screen 30. As a result, the user 3 can view the first and second images 21a and 21b combined into one from an inner region of the curved screen 30 bent in the arc shape (e.g., a position close to overlapping region 22).

Thus, it is possible to provide a considerably great sense of immersion into content and to provide the user 3 with an excellent visual effect.

The direction in which the first and second images 21a and 21b overlap is not limited.

For example, the first and second images 21a and 21b may be projected so as to overlap each other along the short side direction of the first and second images 21a and 21b.

For example, in the configuration example shown in FIG. 3 and FIG. 4, the first and second images 21a and 21b having rectangular shapes taking the left and right direction as the short side direction are projected. The first and second images 21a and 21b may be projected such that the first and second images 21a and 21b overlap along the short side direction of the first and second images 21a and 21b.

Depending on the shape of the curved screen 30, when the image light forming the rectangular image is projected, the image may be displayed in a shape different from the rectangular shape.

In this case, for example, it is possible to define the direction corresponding to the long side direction and the short side direction of the liquid crystal panel P as the long side direction and the short side direction of the image. A plurality of images can be overlapped along the long side direction or the short side direction.

In the present disclosure, the long side direction and the short side direction of the liquid crystal panel P may also be expressed as the long side direction and the short side direction of the image light.

In the present embodiment, as the first and second image display apparatuses 20a and 20b, image display apparatuses having approximately the same configuration are used.

Hereinafter, the projection optical system 15 of the first and second image display apparatus 20a and 20b will be described.

[Projection Optical System]

Figure 5:
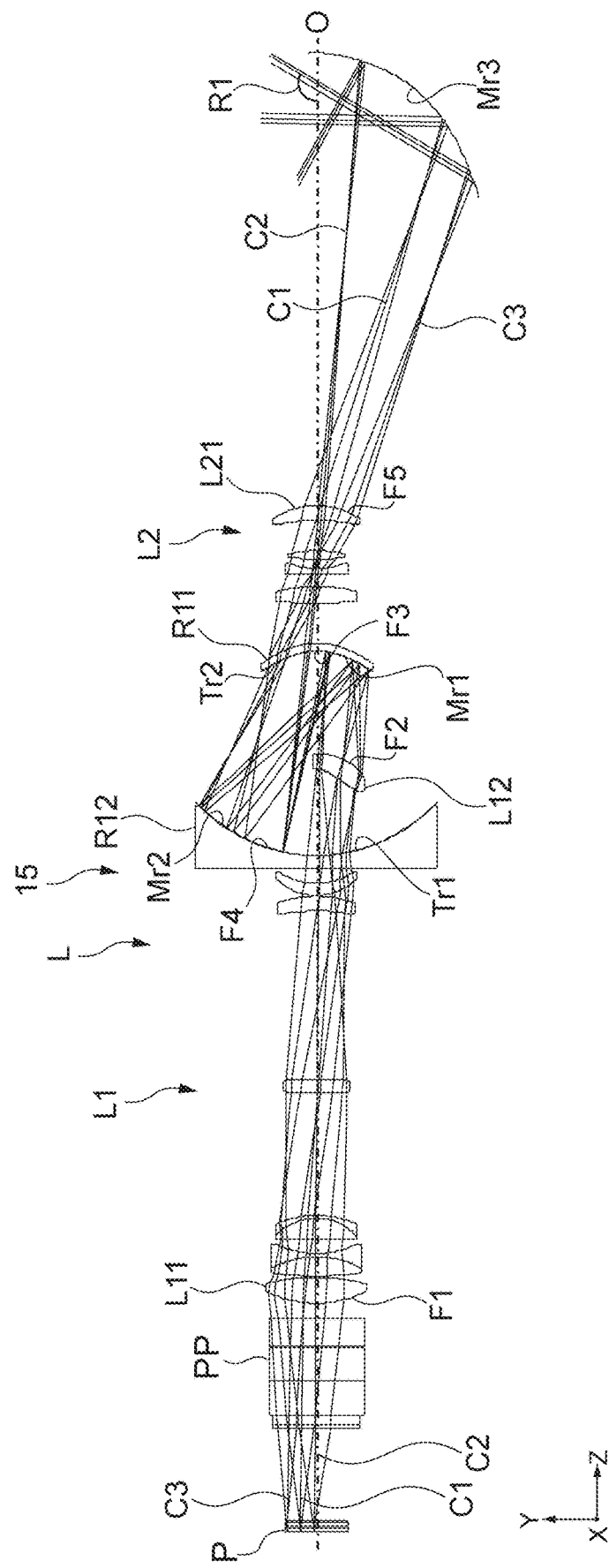
FIG. 5 is an optical path diagram showing a schematic configuration example of a projection optical system according to the first embodiment of the present technology.
Figure 6:
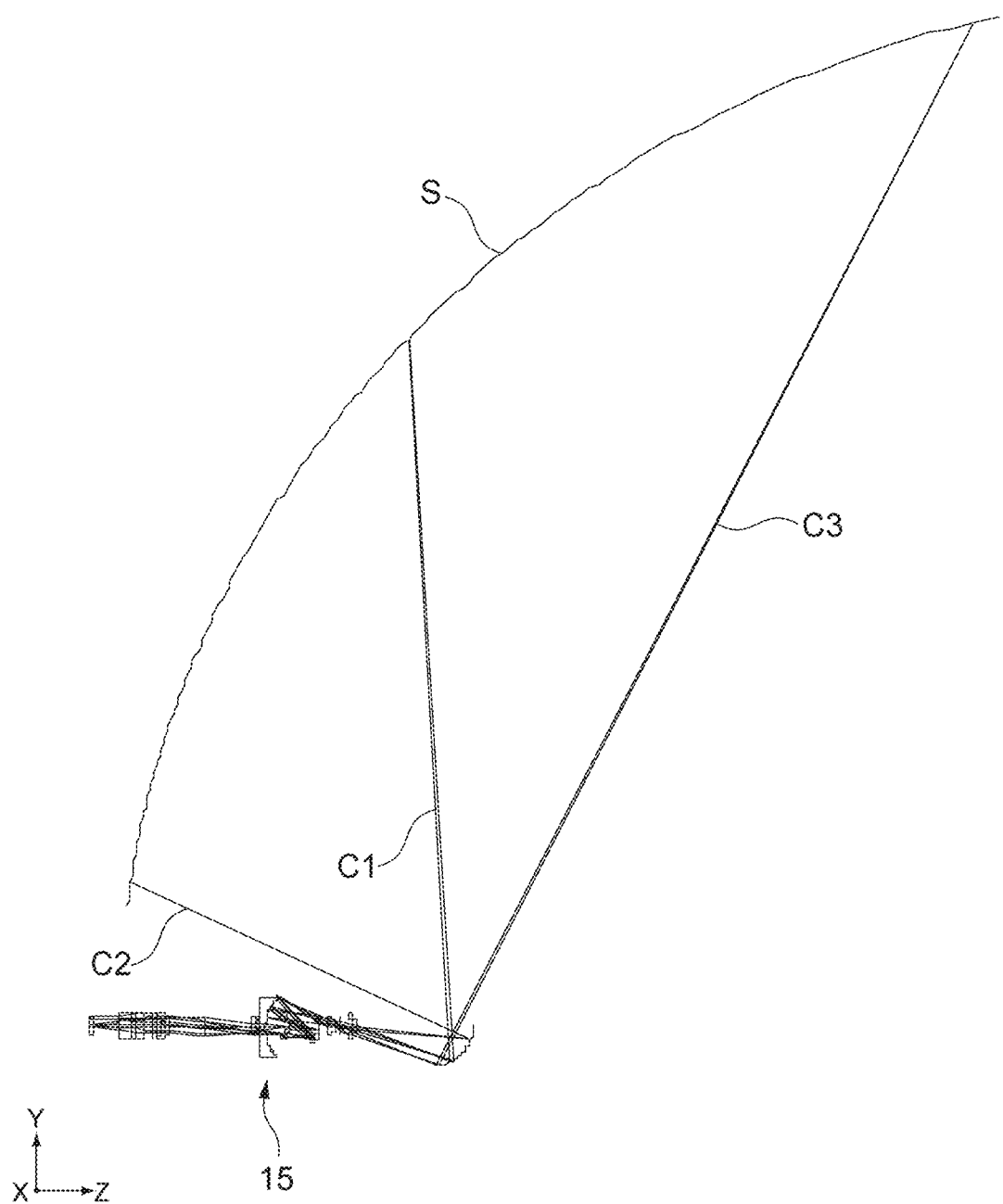
FIG. 6 is an optical path diagram showing the schematic configuration example of the projection optical system according to the first embodiment of the present technology.

FIGS. 5 and 6 are optical path diagrams showing a schematic configuration example of the projection optical system 15 according to the present embodiment. FIG. 6 shows one projection optical system 15 and a portion where the image of the curved screen S is projected.

By combining two configurations of FIG. 6 so as to be symmetrical to each other, it is possible to realize the image display system 100 having the curved screen 30 and the first and second image display apparatuses 20a and 20b shown in FIGS. 3 and 4.

Furthermore, in FIGS. 5 and 6, the liquid crystal panel P and the dichroic prism PP of the lighting optical system 10 are schematically shown.

Hereinafter, an emission direction of the image light emitted from the dichroic prism PP to the projection optical system 15 is set to the Z direction.

Furthermore, a horizontal direction of the primary image plane (liquid crystal panel P) is denoted as the X direction, and a vertical direction is denoted as the Y direction. The X and Y directions correspond to the horizontal and vertical directions of the image formed by the image light.

Also, for convenience, as viewed from side of the projection optical system, in each figure (emission direction of image light), the Z direction may be described as the left-right direction and the Y direction may be described as the up-down direction.

It should be appreciated that in the application of the present technology, the emission direction or the like of the image light is not limited, and a direction and a posture of the image display apparatus 20 or the like may be arbitrarily set.

Furthermore, FIGS. 5 and 6 show cross-sectional shapes of optical surfaces of respective optical components included in the projection optical system 15 (lens surface and reflection surface, etc.). On the other hand, in order to simplify the diagrams, hatching or the like representing the cross-sections of the respective optical components is omitted.

The projection optical system 15 includes a lens system L and a concave reflection surface Mr3.

The lens system L is configured at a position where the image light generated by the lighting optical system 10 is incident and has a positive refractive power as a whole.

The lens system L is configured with reference to a reference axis extending in the Z direction (hereinafter, reference axis is described as optical axis O).

In the present embodiment, the lens system L is configured such that the optical axis of each of the one or more optical components included in the lens system L approximately coincides with the optical axis O which is the reference axis.

Typically, the optical axis of the optical component is an axis that passes through the center of the optical surface of the optical component. For example, in a case where the optical surface of the optical component has the rotational symmetrical axis, the rotational symmetrical axis corresponds to the optical axis.

Only a portion of the optical component disposed such that its optical axis coincides with the optical axis O, including an effective region where the image light is incident, may be used. By using the portion of the optical component, the projection optical system 15 can be miniaturized.

In the present embodiment, the optical axis O is an axis obtained by extending the optical axis (rotational symmetrical axis) of the lens L11 closest to the lighting optical system 10 included in the optical system L. That is, another optical component is disposed on the axis obtained by extending the optical axis of the lens L11.

Note the image light is emitted along the optical axis O from a position offset upward from the optical axis O. The Z direction along the optical axis O can also be referred to as an optical path traveling direction of the lens system L.

As shown in FIG. 5, the lens system L includes a first refractive optical system L1, a first reflection surface Mr1, a second reflection surface Mr2, and a second refractive optical system L2.

The first refractive optical system L1 has a positive refractive power as a whole and refracts the image light generated by the lighting optical system 10.

In the present embodiment, a region from an incident surface F1 to an exit surface F2 functions as the first refractive optical system L1. On the incident surface F1, the image light of the lens L11 disposed at a position closest to the lighting optical system 10 is incident. From the exit surface F2, the image light of the lens L12 disposed at a position closest to the first reflection surface Mr1 is emitted.

The first reflection surface Mr1 is a concave reflection surface and is a rotational symmetrical aspherical surface which is configured such that a rotational symmetrical axis coincides with the optical axis O.

The first reflection surface Mr1 is disposed on a lower side of the optical axis O and reflects back the image light refracted by the first refractive optical system L1. Specifically, the image light incident from the left side is reflected back to an upper left side.

As shown in FIG. 5, in the present embodiment, a first optical component R11 is arranged such that the rotational symmetrical axis coincides with the optical axis O.

The first reflection surface Mr1 is configured in a portion of a region of a lower side of a rotational symmetrical aspherical surface F3 corresponding to a main surface of the first optical component R11. Conversely, a portion of a region of a lower side of the rotational symmetrical aspherical surface F3 is configured as a first reflection surface Mr1.

In the other region of the rotational symmetrical aspherical surface F3 of the first optical component R11, a transmission surface Tr2 is configured.

The second reflection surface Mr2 is a concave reflection surface and is a rotational symmetrical spherical surface configured such that the rotational symmetrical axis coincides with the optical axis O.

The second reflection surface Mr2 is disposed on an upper side of the optical axis O and reflects back the image light reflected by the first reflection surface Mr1 toward the second refractive optical system L2. Specifically, the image light incident from a lower right side is reflected back toward the right side.

As shown in FIG. 5, in the present embodiment, a second optical component R12 is arranged such that the rotational symmetrical axis coincides with the optical axis O.

The second reflection surface Mr2 is configured in a portion of a region of an upper side of the rotational symmetrical surface F4 corresponding to a main surface of the second optical component R12. Conversely, a portion of a region of an upper side of the rotational symmetrical surface F4 is configured as a second reflection surface Mr2.

In the other region of the rotational symmetrical surface F4 of the second optical component R12, a transmission surface Tr1 is configured.

In the present embodiment, the transmission surface Tr2 formed on the rotational symmetrical aspherical surface F3 of the first optical component R11 functions as the second refractive optical system L2. The transmission surface Tr1 formed on the rotational symmetrical surface F4 of the second optical component R12 functions as the first refractive optical system L1.

Thus, one optical component realizes a first reflection surface Mr1 and the optical surface functioning as the second refractive optical system L2 (transmission surface Tr2). Also, it realizes the second reflection surface Mr2 and the optical surface functioning as the first refractive optical system L1 (transmission surface Tr1).

Thus, it is possible to miniaturize the projection optical system 15. In addition, it is possible to improve assembly accuracy of the projection optical system 15.

The second refractive optical system L2 has a positive refractive index as a whole, refracts the image light reflected by the second reflection surface Mr2, and emits to the concave reflection surface Mr3.

In the present embodiment, a region from the transmission surface Tr2 formed in the first optical component R11 to an exit surface F5 functions as the second refractive optical system L2. From the exit surface F5, the image light of the lens L21 disposed at a position closest to the concave reflection surface Mr3 is emitted.

The exit surface F5 of the lens L21 becomes a final lens surface of the second refractive optical system L2. Hereinafter, the exit surface F5 may be referred to as a final lens surface F5 using the same reference numeral.

The concave reflection surface Mr3 is configured with the optical axis O as the reference axis and reflects the image light emitted from the lens system L toward the curved screen S.

The concave reflection surface Mr3 is a rotational symmetrical aspherical surface configured such that a rotational symmetrical aspherical axis (optical axis) coincides with the optical axis O and is configured only of a portion capable of reflecting an effective region on which the image light is incident. That is, not the entire rotational symmetrical aspherical surface but only a necessary portion of the rotational symmetrical aspherical surface is disposed. This makes it possible to realize a miniaturization of the apparatus.

In the present embodiment, on the common optical axis O, the first refractive optical system L1, the first reflection surface Mr1, the second reflection surface Mr2, the second refractive optical system L2, and the concave reflection surface Mr3 are configured.

Therefore, the first refractive optical system L1, the first reflection surface Mr1, the second reflection surface Mr2, the second refractive optical system L2, and the concave reflection surface Mr3 are configured such that the axis obtained by extending the optical axis (rotational symmetrical axis) of the lens L11 closest to the lighting optical system 10 coincides with each optical axis.

Thus, in the present embodiment, each optical axis of all the optical components included in the projection optical system 15 is configured to coincide with the optical axis O.

This makes it possible to reduce the size in the Y direction and miniaturize the apparatus. It is not limited thereto and an optical component whose optical axis is offset from the optical axis O may be included in the projection optical system 15.

Referring to FIGS. 5 and 6, the optical path of the image light will be described.

In FIGS. 5 and 6, among the image lights emitted from the dichroic prism PP to the projection optical system 15, the optical paths of the three pixel lights C1, C2, and C3 are shown.

Incidentally, the pixel light is emitted as divergent light from the pixel of the liquid crystal panel P. The emitted pixel light is imaged on the curved screen S by the projection optical system 15 and is displayed as a pixel of the projection image.

In the present disclosure, the component light emitted along the optical axis O of each pixel light (along Z direction) is taken as the main light beam. Each pixel light is imaged at a position where the main light beam is incident on the curved screen S.

In FIG. 5, as each pixel light, the main light beam and upper and lower maximum divergent lights are shown.

The pixel light C1 corresponds to the pixel light emitted from the pixel in the center of the liquid crystal panel P.

The pixel light C2 corresponds to the pixel light emitted from the pixel closest to the optical axis O in the center of the liquid crystal panel P.

The pixel light C3 corresponds to the pixel light emitted from the pixel farthest from the optical axis O in the center of the liquid crystal panel P.

That is, in the present embodiment, the pixel light C2 corresponds to the pixel light emitted from the pixel closest to the optical axis O of the liquid crystal panel P. Furthermore, the pixel light C3 corresponds to the pixel light emitted from the pixel farthest from the optical axis O, which is located on a straight line connecting the pixel closest to the optical axis O to the pixel in the center of the liquid crystal panel P.

As shown in FIG. 5, the image light emitted from a position offset upward from the optical axis O to the projection optical system 15 along the optical axis O intersects with optical axis O in the first refractive optical system L1, travels to a lower side, and is incident on the first reflection surface Mr1.

The image light incident on the first reflection surface Mr1 is reflected back by the first reflection surface Mr1, intersects again with the optical axis O, travels to an upper side, and is incident on the second reflection surface Mr2.

The image light incident on the second reflection surface Mr2 is reflected back by the second reflection surface Mr2 and is incident on the second refractive optical system L2.

Within the second refractive optical system L2, the image light intersects again with the optical axis O, travels to the lower side, and is emitted toward the concave reflection surface Mr3.

The image light emitted from the second refractive optical system L1 is reflected to the upper side by the concave reflection surface Mr3, intersecting again with the optical axis O, and is projected toward the curved screen S.

As described above, in the present embodiment, the optical path of the image light is configured so as to intersect with the optical axis O. Thus, it is possible to configure the optical path of the image light to the concave reflection surface Mr3 in the vicinity of the optical axis O. As a result, it is possible to reduce the size of the apparatus in the Y direction and to miniaturize the apparatus.

Also, the image light is reflected back by each of the first reflection surface Mr1 and the second reflection surface Mr2. Thus, an optical path length of image light can be sufficiently ensured. As a result, it is possible to reduce the size of the apparatus in the X direction and to miniaturize the apparatus.

Furthermore, in the projection optical system 15 according to the present embodiment, between the dichroic prism PP included in the lighting optical system 10 to the concave reflection surface Mr3, a plurality of intermediate images (not shown) is imaged. The intermediate image is an intermediate image of an image formed by the image light.

This allows to project the image light at the ultra-wide angle. For example, a large screen can be displayed even in a case where a distance between a projector and a screen is short.

In order to image a high-precision image on the screen by the concave reflection surface Mr3, it is essential to optically properly correct the image generated by the lighting optical system 10 and to guide it to the concave reflection surface Mr3.

In the present embodiment, since it is possible to sufficiently ensure the optical path length of the image light by the first reflection surface Mr1 and the second reflection surface Mr2, it is possible to accurately perform an optical correction of the image. That is, an appropriate intermediate image can be generated, and the high-precision image can be easily formed on the screen.

Furthermore, since the optical path length is sufficiently ensured, it is possible to suppress an optical load required to generate the appropriate intermediate image and to suppress an optical power of each optical component included in the projection optical system 15. As a result, it is possible to miniaturize each optical component and to realize the miniaturization of the entire apparatus.

Furthermore, since the plurality of intermediate images is formed in the projection optical system 15, optimal intermediate images can be generated with high accuracy. As a result, it is possible to display the high-precision image on the screen by the concave reflection surface Mr3. As described above, by using the projection optical system 15 according to the present embodiment, it is possible to realize performance enhancement of the apparatus.

As shown in FIGS. 5 and 6, in the present embodiment, by the concave reflection surface Mr3, at least a portion of the light beams included in the image light incident on the concave reflection surface Mr3 is reflected in a direction intersecting at an angle of 90 degrees or more with a direction along the optical axis O as the reference axis.

Note that an intersection angle between the traveling direction of the light beam included in the image light reflected by the concave reflection surface Mr3 and the direction along the optical axis O is defined as follows.

First, an intersection of a straight line extending along the optical axis O and a straight line extending along the traveling direction of the light reflected by the concave reflection surface Mr3 is calculated.

A straight line extending from the intersection to a liquid crystal panel P side is rotated in a traveling direction side of the light beam with reference to the intersection.

At that time, a rotation angle where a straight line extending to the liquid crystal panel P side coincides with a straight line extending along the traveling direction of the light beam is defined as the intersection angle between the traveling direction of the light beam included in the image light reflected by the concave reflection surface Mr3 and the direction along the optical axis O.

In the present embodiment, the concave reflection surface Mr3 is designed such that the intersection angle defined above of at least a portion of the light beams included in the image light reflected by the concave reflection surface Mr3 is 90 degrees or more.

In the example shown in FIG. 5, the pixel light C3 included in the image light is reflected in a direction intersecting with the direction along the optical axis O at an angle of 90 degrees or more. An intersection angle R1 of the image light C3 is a maximum intersection angle. That is, the pixel light C3 is a light beam where the intersection angle is greatest. Other light beams are reflected in a direction intersecting at an angle less than the intersection angle R1 with respect to the direction along the optical axis O.

Here, the pixel light is taken as an example as the light beam included in the image light. It is not limited thereto and at least a portion of the light beams such as a further portion of the light beams included in the pixel light may be reflected in the direction intersecting at an angle of 90 degrees or more from the direction along the optical axis O.

The image display apparatus 20 including the projection optical system 15 shown in in FIGS. 5 and 6 is installed such that the concave reflection surface Mr3 is disposed at a position corresponding to the shape of the curved screen S.

By designing the concave reflection surface Mr3 so as to increase the intersection angle, it is possible to realize a high-quality image display corresponding to the curved screen S.

The present inventor has focused on the main light beam of each pixel light included in the image light with respect to the image display using the concave reflection surface Mr3 and studied repeatedly on behavior of the main light beam. Then, configuration conditions shown below of the projection optical system 15 have been newly found.

Figure 7:
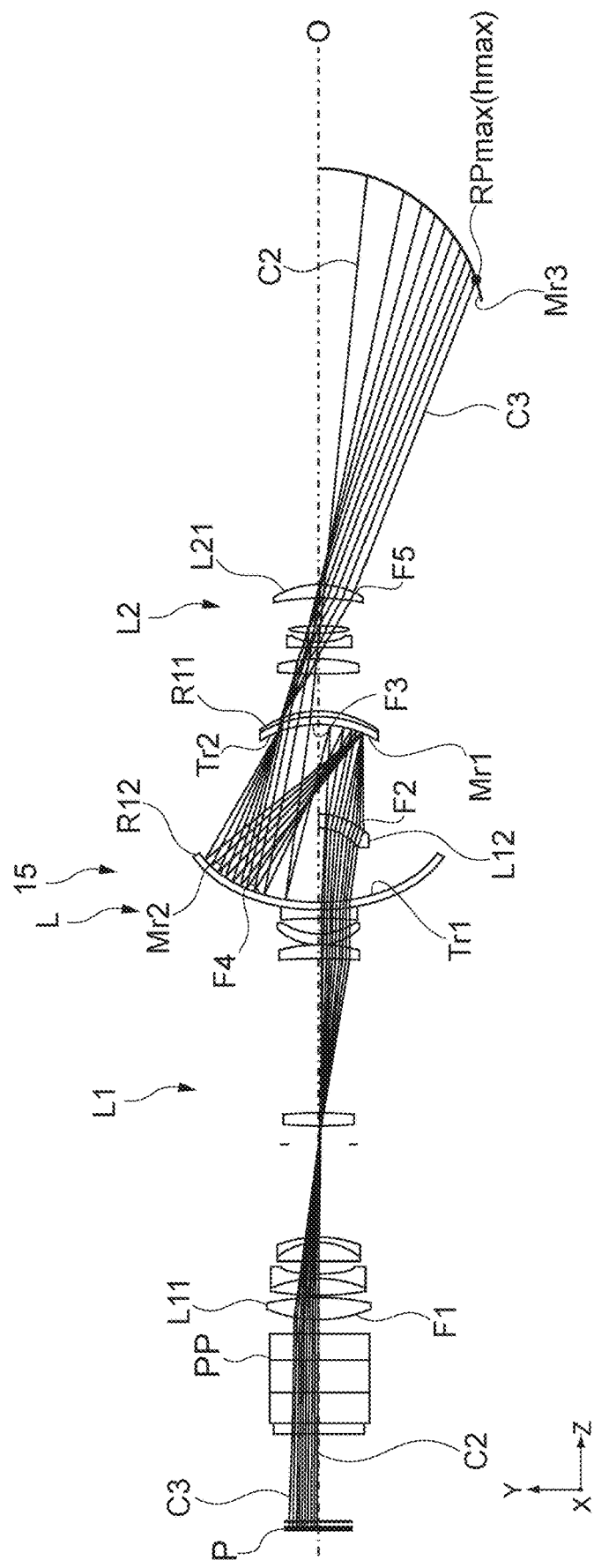
FIG. 7 is a schematic diagram showing an optical path of a pixel light (main light beam) included in image light.

FIG. 7 is a schematic diagram showing the optical path of the pixel light (main light beam) included in the image light. Although the projection optical system 15 shown in FIG. 7 is different from that shown in FIG. 5, the behavior of the pixel light (main light beam) is similar.

Hereinafter, in order to describe the result of consideration, it is assumed that the "light beam" means the "pixel light". In addition, the "light beam" and "pixel light" are intended to mean the main light beam of the "pixel light".

For example, the description of a traveling direction of the light beam (pixel light), an incident position of the light beam (pixel light), a reflection point of the light beam (pixel light) reflected by a reflection surface, a reflection angle of the light beam (pixel light) reflected by the reflection surface, a light beam height (pixel light), etc. mean a traveling direction of the main light beam, an incident position of the main light beam, a reflection point of the main light beam, a reflection angle of the main light beam, a height of the main light beam, etc.

(Configuration Condition 1)

Figure 8:
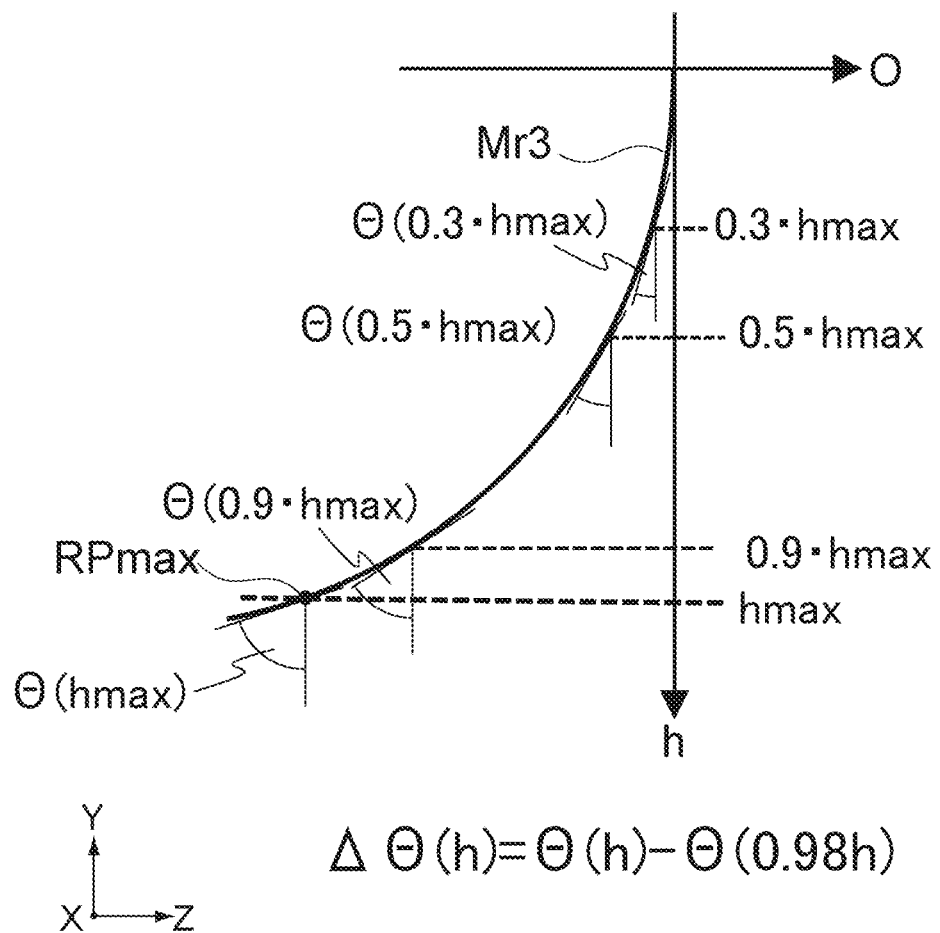
FIG. 8 is a schematic diagram for describing a configuration condition 1.

FIG. 8 is a schematic diagram for describing a configuration condition 1.

As shown in FIG. 8, the light beam height from the optical axis O that is the reference axis is denoted as h.

An angle with respect to an optical axis height direction of a tangent line of a function Z(h) representing a shape of the concave reflection surface Mr3 corresponding to the light beam height h is denoted as θ(h).

As shown in FIG. 8, the optical axis height direction is a direction perpendicular to the optical axis O (Y direction). A slope of the tangent line of the function Z(h) can be calculated by a derivative function Z'(h) obtained by differentiating the function Z(h) by the light beam height h. Using the derivative function Z'(h), it is possible to calculate the angle θ(h).

An amount of change in angle θ(h) at the light beam height h is denoted as Δθ(h).

The light beam height h of a reflection point RPmax farthest from the optical axis O of the concave reflection surface Mr3 for reflecting the image light is denoted as hmax. The light beam height hmax is the light beam height h of the reflection point of the light beam incident on the position farthest from the optical axis O among the lights incident on the concave reflection surface Mr3.

In this case, the projection optical system 15 is configured so as to satisfy the following relationship.

$$0<|\Delta\theta(h\max)-\Delta\theta(0.9\cdot h\max)|/\theta(h\max)<0.056 \quad (1)$$

The conditional expression (1) defines an amount of change in shape of a region where the light beam height h of the concave reflection surface Mr3 is large (hereinafter, referred to as edge side region). More specifically, the amount of change in shape of the region from the region axis height hmax to the optical axis height 0.9·hmax is defined.

The light beams reflected at the edge side region of the concave reflection surface Mr3 configure the edge side region of the image projected on the curved screen S.

If |Δθ(hmax)−Δθ(0.9·hmax)|/θ(hmax) exceeds an upper limit defined in the conditional expression (1), the amount of change in shape of the edge side region of the concave reflection surface Mr3 is increased, and uniformity of luminance (brightness) and magnification of the edge side region of the projection image is reduced.

If $|\Delta\theta(hmax)-\Delta\theta(0.9 \cdot hmax)|/\theta(hmax)$ exceeds a lower limit defined in the conditional expression (1), i.e. if the amount of change in shape of the edge side region of the concave reflection surface Mr3 is 0, the uniformity of the luminance and the magnification of the edge side region of the projection image is also reduced.

The concave reflection surface Mr3 is configured so as to satisfy the conditional expression (1). That is, with respect to the light beam in which a reflection point reflected by the concave reflection surface Mr3 is included in a range from the optical axis height hmax to 0.9·hmax, it is designed such that the change in shape of the concave reflection surface Mr3 is gentle. Thus, it is possible to improve the uniformity of the luminance and the magnification of the edge side region of the projection image and to realize the high-quality image display.

As shown in FIG. 8, in the present embodiment, $\Delta\theta(h)$ is $\theta(h)-\theta(0.98 \cdot h)$. It should be appreciated that it is not limited thereto, other parameters representing the amount of change $\Delta\theta(h)$ of the angle $\theta(h)$ at the light beam height h may be used.

Configuration Condition 2

Figure 9:
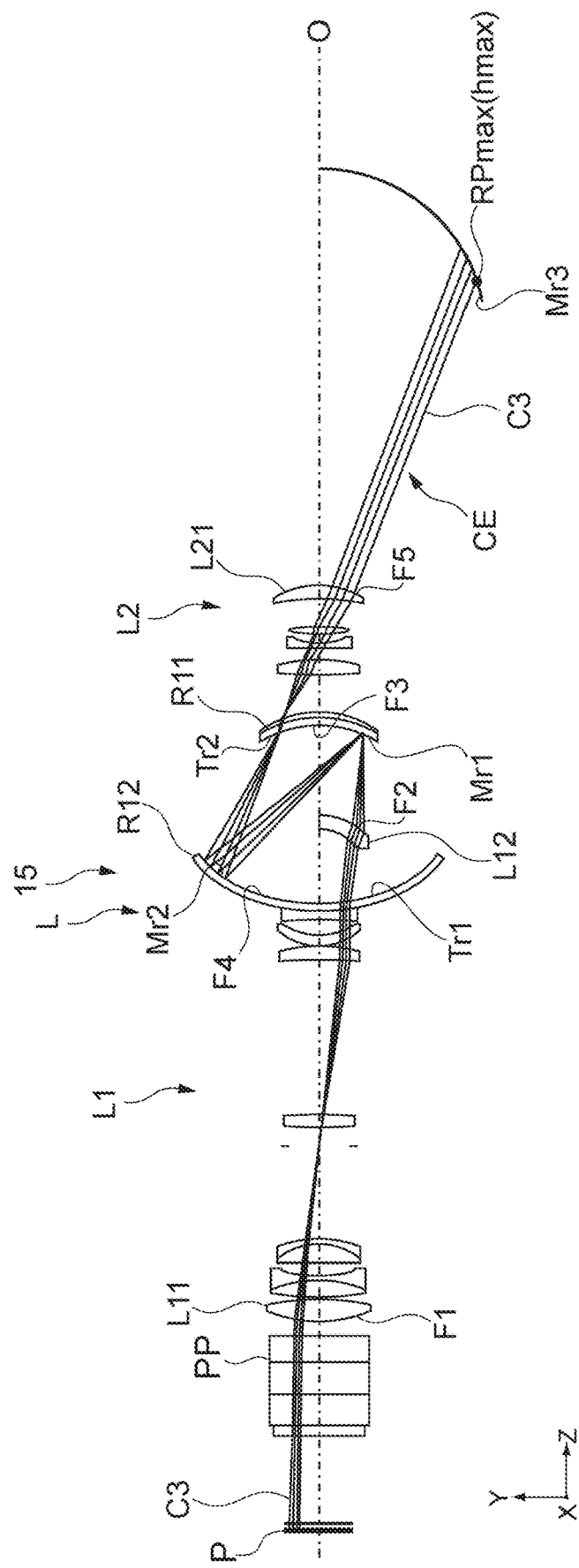
FIG. 9 is a schematic diagram for describing a configuration condition 2.

FIG. 9 is a schematic diagram for describing a configuration condition 2.

As shown in FIG. 9, the light beams of the image light included in a region having the reflection point reflected by the concave reflection surface Mr3 of larger than 0.85·hmax are denoted as edge side light beams CE.

The projection optical system 15 is configured such that the traveling directions of each of the edge side light beams CE incident on the concave reflection surface Mr3 are parallel to each other. That is, the projection optical system 15 is configured such that the edge side light beams CE incident on the concave reflection surface Mr3 are parallel light beams.

Thus, it is possible to improve the uniformity of the luminance and the magnification of the edge side region of the projection image.

Configuration Condition 3

The projection optical system 15 is configured such that light beam spaces of the edge side light beams CE incident on the concave reflection surface Mr3 are equal. This can be said that the reflection points of the respective edge side light beams CE on the concave reflection surface Mr3 are arranged at equal spaces.

Thus, it is possible to improve the uniformity of the luminance and the magnification of the edge side region of the projection image.

Configuration Condition 4

The power of the first reflection surface Mr1 is denoted as $\Phi 1$.

The power of the second reflection surface Mr2 is denoted as $\Phi 2$.

In this case, the projection optical system 15 is configured so as to satisfy the following relationship.

$$0.1<|\Phi 2/\Phi 1|<1.2 \quad (2)$$

The conditional expression (2) defines a relationship between the power $\Phi 1$ of the first reflection surface Mr1 and the power $\Phi 2$ of the second reflection surface Mr2.

If $|\Phi 2/\Phi 1|$ exceeds an upper limit defined in the conditional expression (2), the light beams reflected by the first reflection surface Mr1 and the light beams reflected by the second reflection surface Mr2 interfere.

If $|\Phi 2/\Phi 1|$ exceeds a lower limit defined in the conditional expression (2), the light beams reflected by the second reflection surface Mr2 are not properly incident on the second refractive optical system L2. That is, the light beams reflected by the second reflection surface Mr2 are not properly incident on the transmission surface Tr2 of the first optical component R11.

By configuring the first reflection surface Mr1 and the second reflection surface Mr2 so as to satisfy the conditional expression (2), it is possible to properly guide the image light to the concave reflection surface Mr3. This makes it possible to realize the high-quality image display.

Configuration Condition 5

Figure 10A:
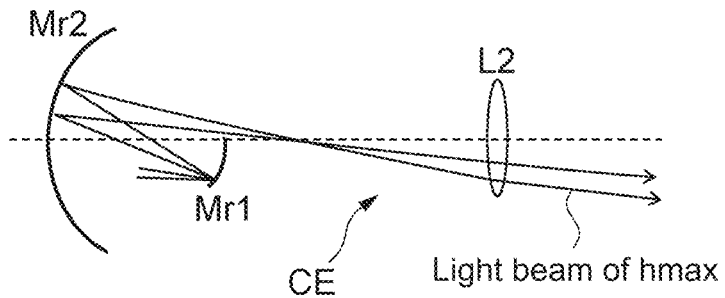
FIGS. 10A, 10B and 10C are schematic diagrams for describing a configuration condition 5.
Figure 10B:
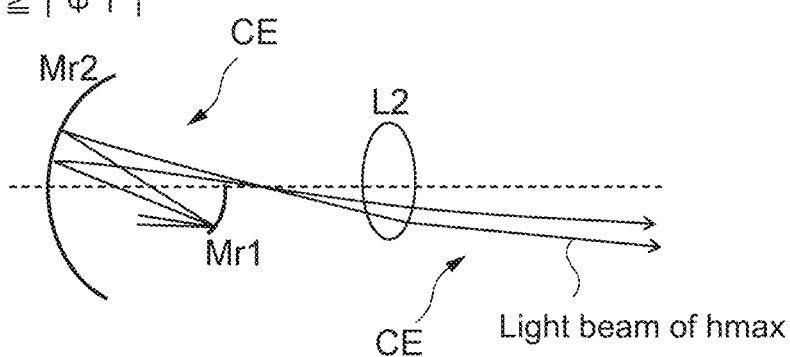
Figure 10C:
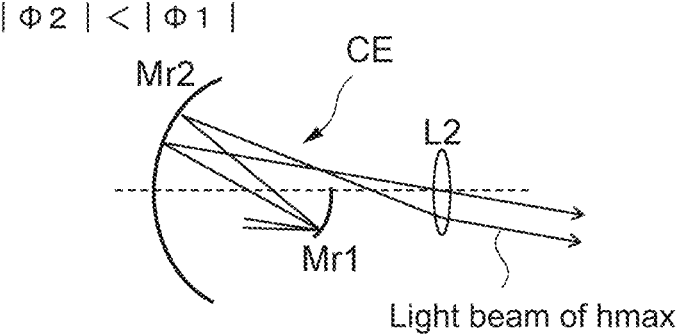

FIGS. 10A, 10B and 10C are schematic diagrams for describing a configuration condition 5.

The projection optical system 15 is configured so as to satisfy the following relationship.

$$|\Phi 2|<|\Phi 1| \quad (3)$$

As shown in FIGS. 10A, 10B and 10C, in order to satisfy the above-described (Configuration condition 2), in the second refractive optical system L2, a large refractive power is required to be exerted on the light beam (in particular, light beam having light beam height hmax) where the light beam height h increases.

If conditional expression (3) is not satisfied, i.e., $|\Phi 2| \geq |\Phi 1|$, in order to exert the large refractive power on the light beams having the light beam height hmax, it is conceivable to design a large distance between the second reflection surface Mr2 and the second refractive optical system L2, for example, as shown in FIG. 10A. However, if the distance between the second reflection surface Mr2 and the second refractive optical system L2 is increased, the projection optical system 15 has a large size.

Alternatively, as shown in FIG. 10B, it is also conceivable to increase the power of the second refractive optical system L2. However, if the power of the second refractive optical system L2 is increased, aberration is likely to occur in the projection image, and image quality is likely to be reduced.

As shown in FIG. 10C, the first reflection surface Mr1 and the second reflection surface Mr2 are configured so as to satisfy the conditional expression (2).

This allows the light beams having the light beam height hmax to be largely reflected to the upper side. Therefore, it is possible to emit the light beam height hmax with an angle from the upper side from the second reflection surface Mr2 to the second refractive optical system L2. As a result, the large refractive power can be exerted on the light beams having the light beam height hmax.

Therefore, it is possible to realize the miniaturization and aberration suppression of the apparatus while satisfying the (Configuration condition 2). Conversely, without increasing the projection optical system 15, also without generating aberration in the projection image, it is possible to satisfy the (Configuration condition 2).

Configuration Condition 6-1

Figure 11:
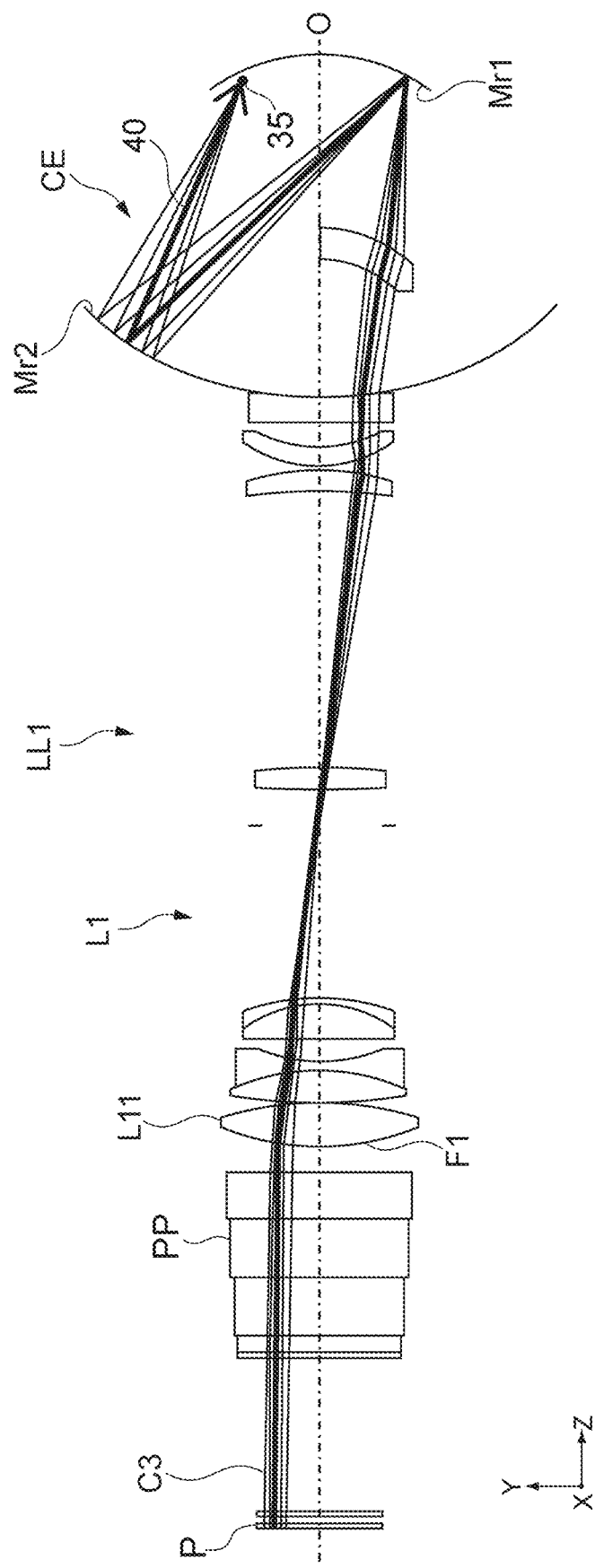
FIG. 11 is a schematic diagram for describing a configuration condition 6.
Figure 12:
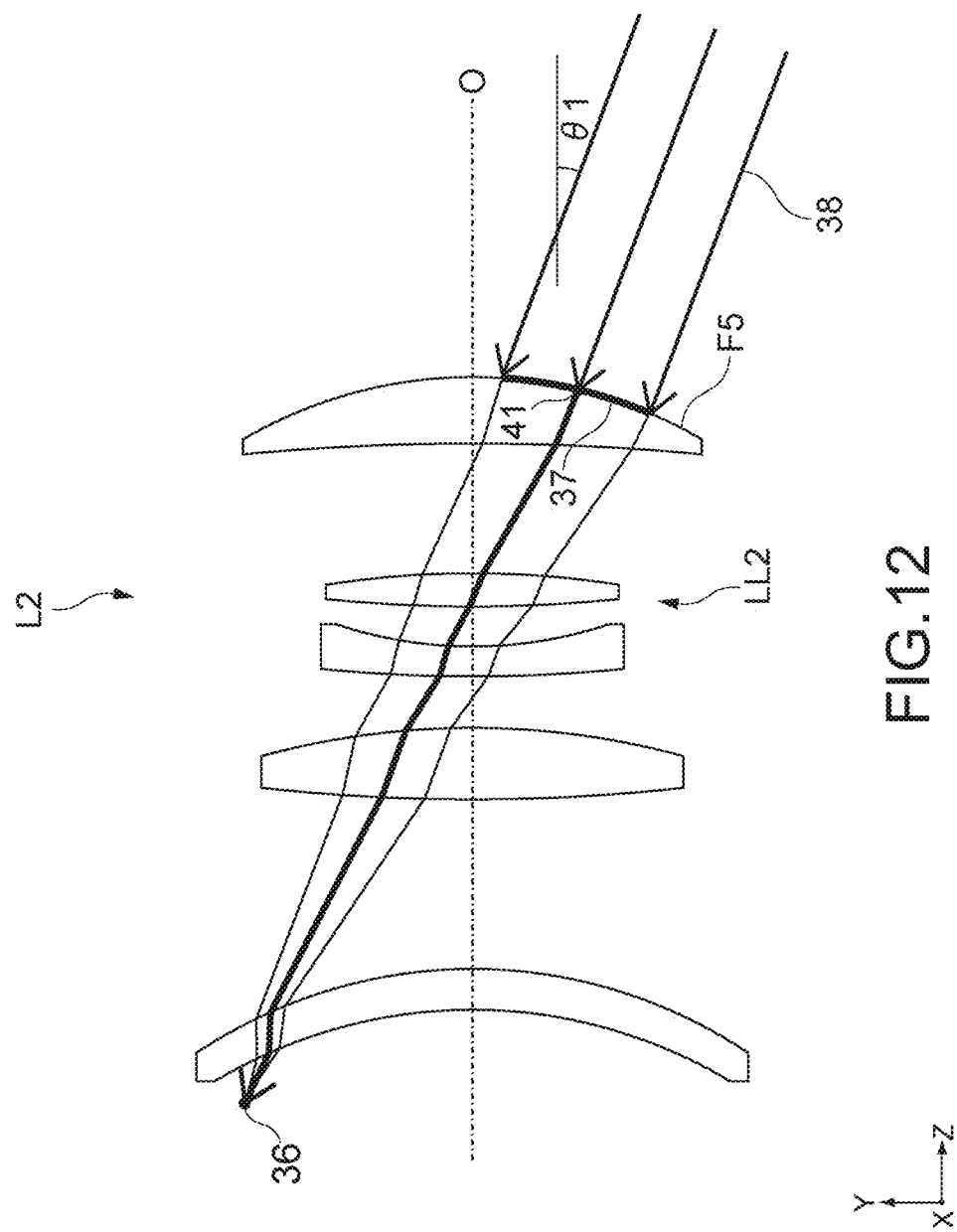
FIG. 12 is a schematic diagram for describing the configuration condition 6.
Figure 13:
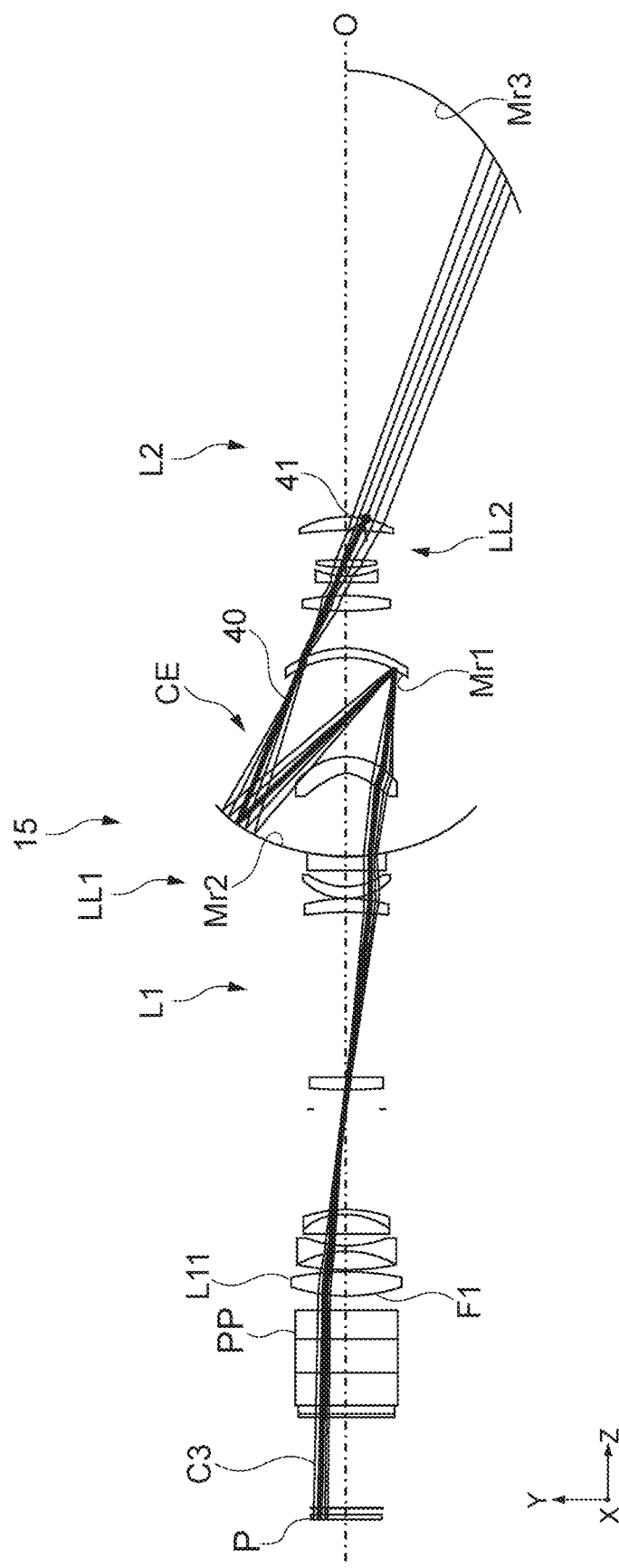
FIG. 13 is a schematic diagram for describing the configuration condition 6.

FIGS. 11 to 13 are schematic diagrams for describing configuration conditions 6.

A first optical system LL1 includes the first refractive optical system L1, the first reflection surface Mr1, and the second reflection surface Mr2. That is, the first optical system LL1 is from the incident surface F1 of the lens L11 to the second reflection surface Mr2.

A second optical system LL2 is a portion acting on the edge side light beams of the second refractive optical system L2. That is, if the portion where the edge side light beams CE travel of the second refractive optical system L2 is taken as one optical system, the optical system is the second optical system LL2.

The projection optical system 15 is configured such that the first optical system L1 condenses the edge side light beams CE to a predetermined condensing position 35. In addition, the projection optical system 15 is configured such that the condensing position 35 coincides with a front focus position 36 of the second optical system LL2.

That is, the projection optical system 15 is configured such that the first optical system LL1 condenses the edge side light beams CE on the front focus position 36 of the second optical system LL2.

Referring to FIG. 12, the front focus position 36 of the second optical system LL2 will be described.

An average value of an angle in which each traveling direction of the edge side light beams CE incident on the concave reflection surface Mr3 (direction of incident on concave reflection surface Mr3) and the direction along the optical axis O that are intersected is denoted as an average angle θ1.

A region on which the edge side light beams CE are incident of the final lens surface F5 of the second refractive optical system L2 is denoted as an edge side incident region 37.

As shown in FIG. 12, the front focus position 36 of the second optical system LL2 is a condensing position when a parallel beam 38 is incident on the edge side incident region 37 of the final lens surface F5 from an opposite side along the direction intersecting at the average angle θ1 with respect to the direction along the optical axis O.

Configuration Condition 6-2

As a condition equal to the (Configuration condition 6-1), (Configuration condition 6-2) will be described.

As shown in FIGS. 11 and 13, among the edge side light beams CE, a light beam having the light beam height h at the reflection point reflected by the concave reflection surface Mr3 being an intermediate value is denoted as an intermediate light beam 40. In FIGS. 11 and 13, the intermediate light beam 40 is shown by a thick arrow.

The incident position of the intermediate light beam 40 with respect to the final lens surface F5 of the second refractive optical system L2 is denoted as the intermediate incident position 41.

The optical path length of the intermediate light 40 from the lighting optical system 10 to the condensing position 35 is denoted as A. Specifically, as shown in FIG. 13, the optical path length from the image modulation element (liquid crystal panel P) to the condensing position 35 is denoted as the optical path length A.

The optical path length from the intermediate incident position 41 to the front focus position 36 is denoted as B. As shown in FIG. 12, the optical path length B is the optical path length of the light beam (thick arrow in FIG. 12) traveling from the intermediate incident position 41 to the front focus position 36 when the parallel light beam 38 is incident on the edge side incident region 37 of the final lens surface F5 from the opposite side.

The optical path length from the lighting optical system 10 of the intermediate light 40 to the intermediate incident position 41 is denoted as C. Specifically, as shown in FIG. 13, the optical path length from the image modulation element (liquid crystal panel P) to the intermediate incident position 41 is denoted as the optical path length C.

In this case, the projection optical system 15 is configured so as to satisfy the following relationship.

$$0.8 < |A+B|/C < 1.2 \quad (4)$$

That is, in the present disclosure, if the range satisfies the conditional expression (4), the condensing position 35 coincides with the front focus position 36 and the (Configuration condition 6-1) is satisfied.

If |A+B|/C exceeds the upper limit defined by the conditional expression (4), the edge side light beams CE emitted from the second refractive optical system L2 diverge and do not become the parallel light beam.

If |A+B|/C exceeds the lower limit defined by the conditional expression (4), the edge side light beams CE emitted from the second refractive optical system L2 are condensed and do not become the parallel light beam.

The projection optical system 15 is configured so as to satisfy the conditional expression (4). That is, the projection optical system 15 is configured such that the condensing position 35 coincides with the front focus position 36. Thus, it becomes possible to satisfy the (Configuration condition 2) and to improve the uniformity of the luminance and the magnification of the edge side region of the projection image.

In the projection optical system 15 of the present embodiment, a first intermediate image is imaged between the dichroic prism PP included in the lighting optical system 10 and the first reflection surface Mr1.

A second intermediate image is imaged between the first reflection surface Mr1 and the second reflection surface Mr2.

Furthermore, a third intermediate image is imaged between the second refractive optical system L2 and the concave reflection surface Mr3.

An image is imaged on the screen by the concave reflection surface Mr3.

The first optical system LL1 may also be denoted as a front stage optical system taking the second intermediate image as a boundary. The second optical system LL2 may also be a later stage optical system taking the second intermediate image as the boundary.

It should be appreciated that the application of the present technology is not limited to the case of imaging the intermediate image.

In the present embodiment, the edge side light beams CE are emitted from the liquid crystal panel P along the optical axis O. Therefore, the condensing position 35 on which the edge side light beams CE are condensed by the first optical system LL1 may also be denoted as a back focus position of the first optical system LL1.

Therefore, in the present embodiment, for the (Configuration condition 6-1) and the (Configuration condition 6-2), the condensing position 35 may also be referred to as the back focus position of the first optical system LL1.

Upon configuring the projection optical system 15 according to the present technology, all of the configuration conditions listed above are not necessarily satisfied. If at least one of the above configuration conditions is satisfied, it is possible to function as the embodiment of the projection optical system according to the present technology. It is possible to realize the high-quality image display.

It should be appreciated that all the configuration conditions may be satisfied. Alternatively, the projection optical system 15 may be configured such that any two or more configuration conditions are satisfied.

The lower limit and the upper limit of each of the conditional expressions (1), (2), and (4) are not limited to the above-described values. For example, the respective values can be changed as appropriate depending on the configuration of the lighting optical system 10, the projection optical system 15, and the like. For example, an arbitrary value included in the above-mentioned range may be selected as the lower limit value and the upper limit value and may be set as the optimum range again.

For example, the conditional expression (1) can be set to the following ranges.

$$0.01 < |\Delta\theta(h\ \max) - \Delta\theta(0.9 \cdot h\ \max)|/\theta(h\ \max) < 0.06$$

$$0.02 < |\Delta\theta(h\ \max) - \Delta\theta(0.9 \cdot h\ \max)|/\theta(h\ \max) < 0.05$$

$$0.03 < |\Delta\theta(h\ \max) - \Delta\theta(0.9 \cdot h\ \max)|/\theta(h\ \max) < 0.04$$

For example, the conditional expression (2) can be set to the following ranges.

$$0.05 < |\Phi 2/\Phi 1| < 1.3$$

$$0.15 < |\Phi 2/\Phi 1| < 1.15$$

$$0.2 < |\Phi 2/\Phi 1| < 1.1$$

For example, the conditional expression (4) can be set to the following ranges.

$$0.7 < |\Phi 2/\Phi 1| < 1.3$$

$$0.9 < |\Phi 2/\Phi 1| < 1.15$$

$$1.0 < |\Phi 2/\Phi 1| < 1.1$$

The projection optical system 15 configured as described above will be briefly described with reference to specific numerical examples.

Figures 14, 15:
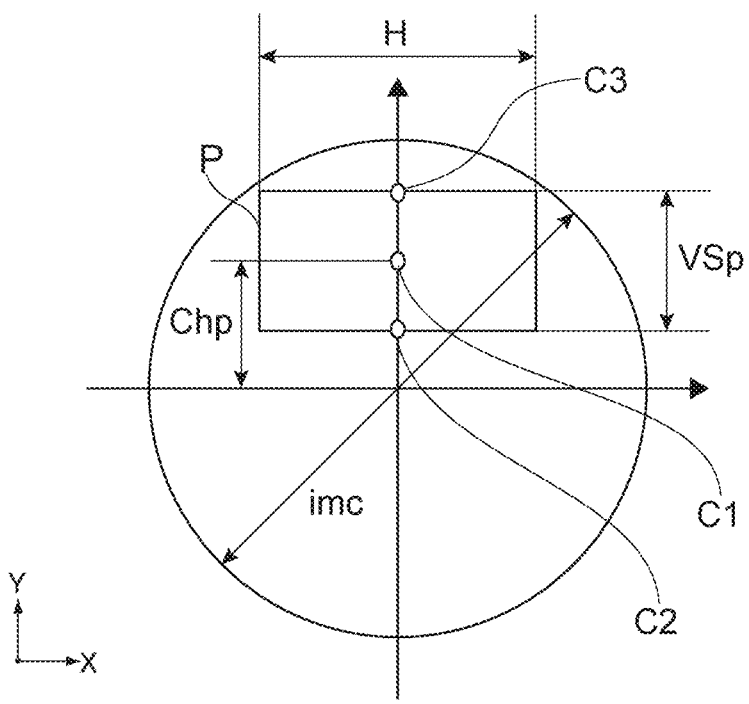
FIG. 14 is a table showing an example of parameters relating to image projection.
FIG. 15 is a schematic diagram for describing the parameters shown in FIG. 14.

FIG. 14 is a table showing an example of parameters relating to image projection.

FIG. 15 is a schematic diagram for describing the parameters shown in FIG. 14.

A numerical aperture NA of the projection optical system 15 on a primary image plane side is 0.127.

Length of the image modulation element (liquid crystal panel P) in the left-right direction and the up-down direction (H×VSp) are 15.6 mm and 8.7 mm.

A center position (Chp) of the image modulation element is 5.6 mm above the optical axis O.

An image circle (imc) of the primary image plane side is φ26.3 mm.

As shown in FIG. 15, the pixel light C1 shown in FIG. 5 and the like is emitted from the center pixel of the liquid crystal panel P (denoted as pixel C1 by the same reference numeral).

From the pixel closest to the optical axis O of the center of the liquid crystal panel P, the pixel light C2 is emitted (denoted as pixel C2 using the same reference numeral).

From the pixel farthest from the optical axis O of the center of the liquid crystal panel P, the pixel light C3 is emitted (denoted as pixel C3 using the same reference numeral).

For the configuration conditions for the edge side light beams CE, similar configuration conditions may be applied to the light beams defined using the image circle (imc).

Figure 16:
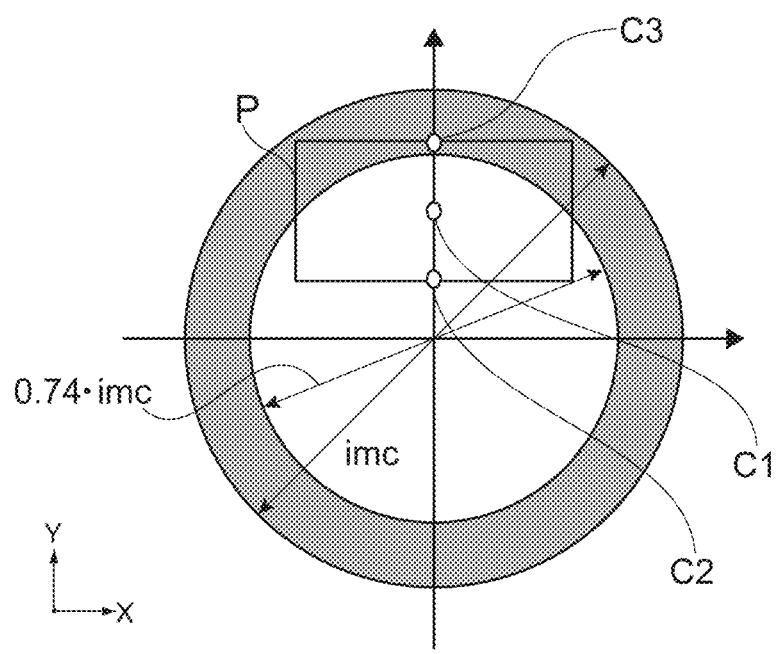
FIG. 16 is a schematic diagram for describing high-image high-emission light beams.

For example, as shown in FIG. 16, the image circle (0.74·imc) having an image height of 74% is defined with respect to the image circle (imc) having a maximum image height.

The light beams emitted from the region from the image circle with the image height of 74% to the image circle with the maximum image height (imc) (region displayed in gray in the figure) are denoted as high-image high-emission light beams.

For the high-image high-emission light beams, the following configuration conditions are shown.

The projection optical system 15 is configured such that the high-image high-emission light beams are incident on the concave reflection surface Mr3 as parallel light beams (Condition corresponding to configuration conditions 2).

The projection optical system 15 is configured such that the high-image high-emission light beams are incident on the concave reflection surface Mr3 at equal light beam spaces (Condition corresponding to configuration condition 3).

In the portions of the first optical system LL1 and the second refractive optical system L2 acting on the high-image high-emission light beams, as shown in FIG. 13, the condensing position 35 coincides with the front focus position 36 (Condition corresponding to configuration condition 6-1).

In the portions of the first optical system LL1 and the second refractive optical system L2 acting on the high-image high-emission light beams, the conditional expression (4) is satisfied (Condition corresponding to configuration condition 6-2).

By configuring the projection optical system 15 so as to satisfy the configuration conditions relating to the high-image high-emission light beams, similar effects as described above are exhibited. That is, it is possible to improve the uniformity of the luminance and the magnification of the edge side region of the projection image and to realize the high-quality image display.

Note that a high-image high-emission light beams group and an edge side light beams group may be the same light beam group or may be different light beam groups.

FIG. 17 is lens data of the image display apparatus.

FIG. 17 shows data on 1 to 33 optical components (lens surfaces) arranged from the primary image plane (P) side to the secondary image plane (S) side and the curved screen S.

As the data of each of the optical components (lens surfaces), a curvature radius (mm), a core thickness d (mm), a refractive index nd in a d line (587.56 nm), and an Abbe number νd in the d line are described. For the curved screen S, the curvature radius (mm) is described.

Note that the optical component having an aspherical surface follows the following expression.

$$Z = \frac{ch^2}{1 + \{1 - (1+K)c^2h^2\}^{1/2}} + \sum_{i=1} Aih^i \quad \text{[Math. 1]}$$

FIG. 18 is a table showing an example of aspherical coefficients of the optical components included in the projection optical system.

FIG. 18 shows aspherical coefficients for the respective aspherical optical components 19, 20, 21, 23, 24, and 33, marked with * in FIG. 17. The aspherical coefficients of the figure example correspond to the above expression (Expression 1).

In the present embodiment, the expression (Expression 1) corresponds to a function Z(h) representing the shape of the concave reflection surface Mr3 corresponding to the light beam height.

In the expression (Expression 1), a sag amount Z when entering the light height h is used as a parameter representing the shape of the concave reflection surface Mr3 according to the light beam height. Note that the "sag amount" represents a distance between a plane and a point on the lens surface in the optical axis direction when a plane perpendicular to the optical axis is made through the plane apex.

The derivative Z'(h) (=dZ/dh) obtained by differentiating the function Z(h) by the light beam height is expressed by the following expression.

$$\frac{dZ}{dh} = \frac{2ch}{1+\{1-(1+K)c^2h^2\}^{1/2}} + \frac{(1+K)c^3h^3}{1+\{1-(1+K)c^2h^2\}^{1/2} * [1+\{1-(1+K)c^2h^2\}^{1/2}]^2} + A_1 + 2A_2h + 3A_3h^2 + \ldots$$

[Math. 2]

By this expression, a slope of a straight line tangent to the concave reflection surface Mr3 at the light beam height h is calculated. That is, it is possible to calculate the angle θ(h) with respect to the optical axis height direction of the tangent line of the function Z(h).

Figures 19, 20:
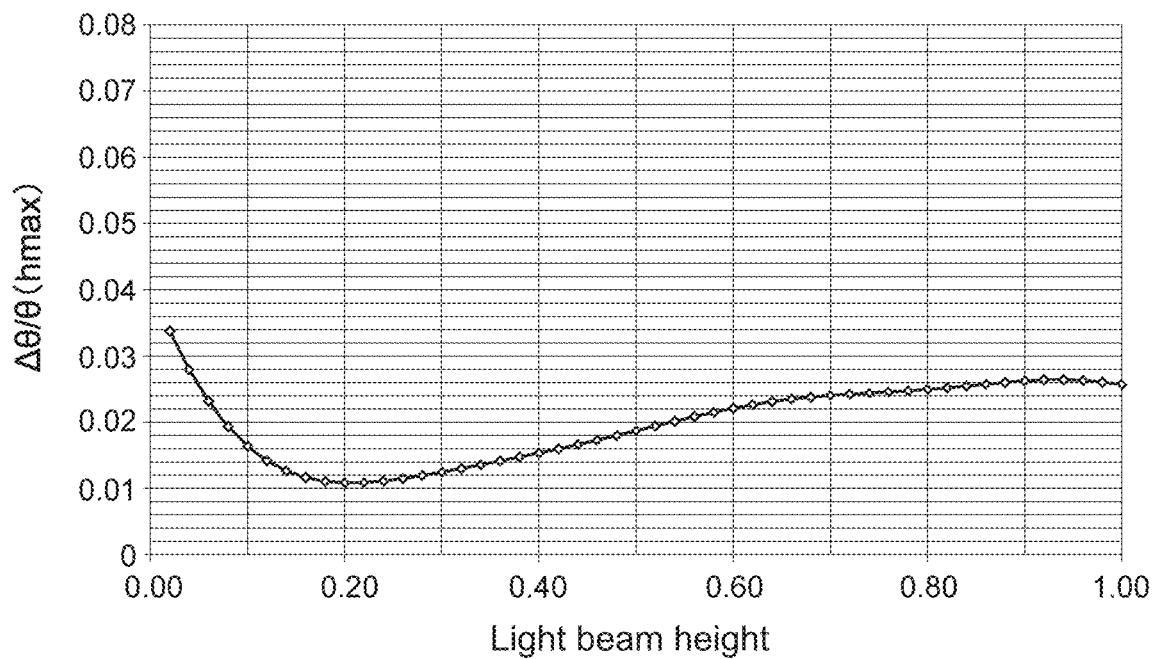
FIG. 19 is a graph showing a relationship between a light beam height h and Δθ(h)/θ(hmax).
FIG. 20 is a table showing numerical values of parameter used by conditional expressions (1), (2), and (4).

FIG. 19 is a graph showing a relationship between the light beam height h and Δθ(h)/θ(hmax).

Incidentally, by setting the light height h of the optical axis O to 0 and the light beam height hmax 1, and the calculation is performed after normalization with respect to the light beam height h.

The Δθ(h)/θ(hmax) changes gradually from 0.9 to 1.00 of the light beam height away from the optical axis O.

This means that a shape change is gradual over the edge side region of the concave reflection surface Mr3 with the light beam height from (0.9·hmax) to (hmax). That is, it means that the shape change of the reflection surface is gradual with respect to the light beam having the reflection point from (0.9·hmax) to (hmax).

Thus, it is possible to improve the uniformity of the luminance and the magnification of the edge side region of the projection image and to realize the high-quality image display.

Note that |Δθ(hmax)−Δθ(0.9·hmax)|/θ(hmax) in the conditional expression (1) is a difference between a value of the light height 1.00 and the value of the light beam height 0.9 of the graph shown in FIG. 19.

FIG. 20 is a table showing numerical values of the parameters used by the above-mentioned conditional expressions (1) (2), and (4) in the present embodiment.

|Z'(1.0·h max)Z'(0.9·h max)|0.001

|Φ2/Φ1|0.370

|A+B|/C1.004

The result reveals that the conditional expressions (1), (2), and (4) are satisfied. The conditional expression (3) is also satisfied.

In the present embodiment, all the Configuration conditions 1 to 6 are satisfied.

In the present embodiment, the conditional expression (4) is satisfied for the light beams emitted from the region from the image circle having the image height of 59% to the image circle (imc) having the maximum image height. Therefore, it is also possible to define the light beam as the high-image high-emission light beams.

As described above, in the image display apparatus 20 according to the present embodiment, the shape of the concave reflection surface Mr3 for reflecting the image light toward the object to be projected is designed as described above. This makes it possible to realize the high-quality image display.

Furthermore, in the image display apparatus 20 according to the present embodiment, by the concave reflection surface Mr3, at least a portion of the light beams of the image light is reflected in a direction along the optical axis O as a reference in constituting the projection optical system 15 and a direction intersecting at an angle of 90 degrees or more. Thus, it is possible to correspond to the projection of the image, for example, on the curved screen S or the like and to realize the high-quality image display.

For example, considering a case where the same image light is projected to a flat screen and a curved screen, respectively, as a matter of course, the image displayed on the flat screen and the image displayed on the curved screen have different shapes. Considering the image displayed on the flat screen as a reference, the image displayed on the curved screen is a distorted image.

Therefore, in order to properly display the image on the curved screen, electrical correction processing should be performed on the image signal. A correction amount is often great, which depends on the shape of the curved screen, and there is a possibility that the image quality or the like of the image is reduced.

Also, in order to display the image over a wide range of the curved screen, the image display apparatus must be installed at a position away from the curved screen. As a result, presence of the image display apparatus stands out for the user who views the image, and the sense of immersion in the content is impaired. Also, because the region where a shadow of the user appears becomes large, the region where the user can move becomes small. As a result, it becomes difficult to provide an excellent viewing environment.

In the image display system 100 according to the present embodiment, the range that can be reflected by the concave reflection surface Mr3 is widely designed so as to be 90 degrees or more with respect to the optical axis O serving as a reference. As a result, it is possible to suppress distortion of the image displayed optically on the curved screen S. This allows to sufficiently suppress an amount of electrical correction for the image signal. As a result, it is possible to display image with a high image quality.

Furthermore, as shown in FIG. 3, since it is possible to project the image in the wide range of the curved screen S from a position close to the curved surface screen S, by the presence of the first and second image display apparatus 20a and 20b, it is possible to sufficiently suppress the sense of immersion by the user 3 to the content from being inhibited. In addition, since it is possible to reduce the region in which the shadow of the user 3 appears, the region in which the user 3 can move can be enlarged. As a result, it is possible to provide a very excellent viewing environment.

Second Embodiment

An image display system according to a second embodiment of the present technology will be described. In the following description, the description of the same configurations and actions as those of the image display system 100 and the image display apparatus 20 described in the above embodiment will be omitted or simplified.

Figure 21:
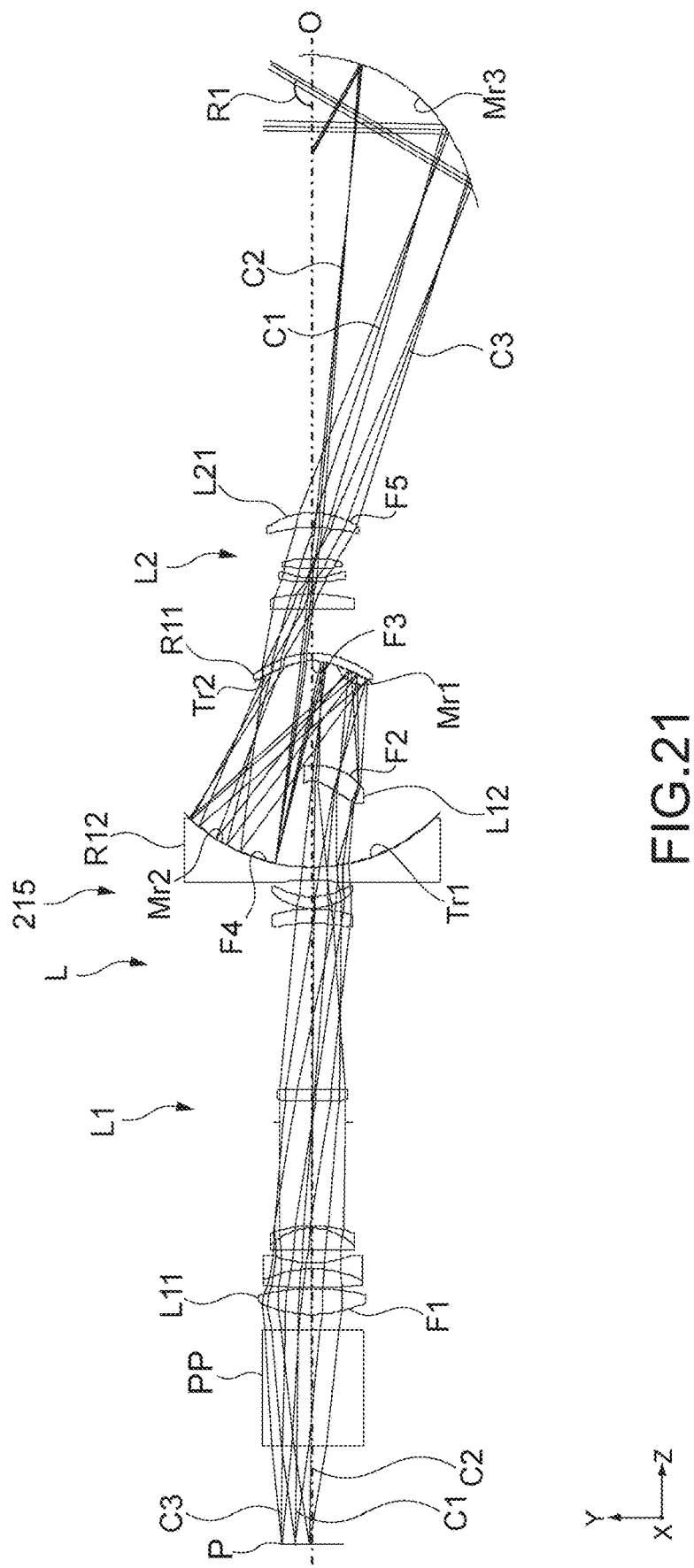
FIG. 21 is an optical path diagram showing a schematic configuration example of a projection optical system according to a second embodiment.
Figure 22:
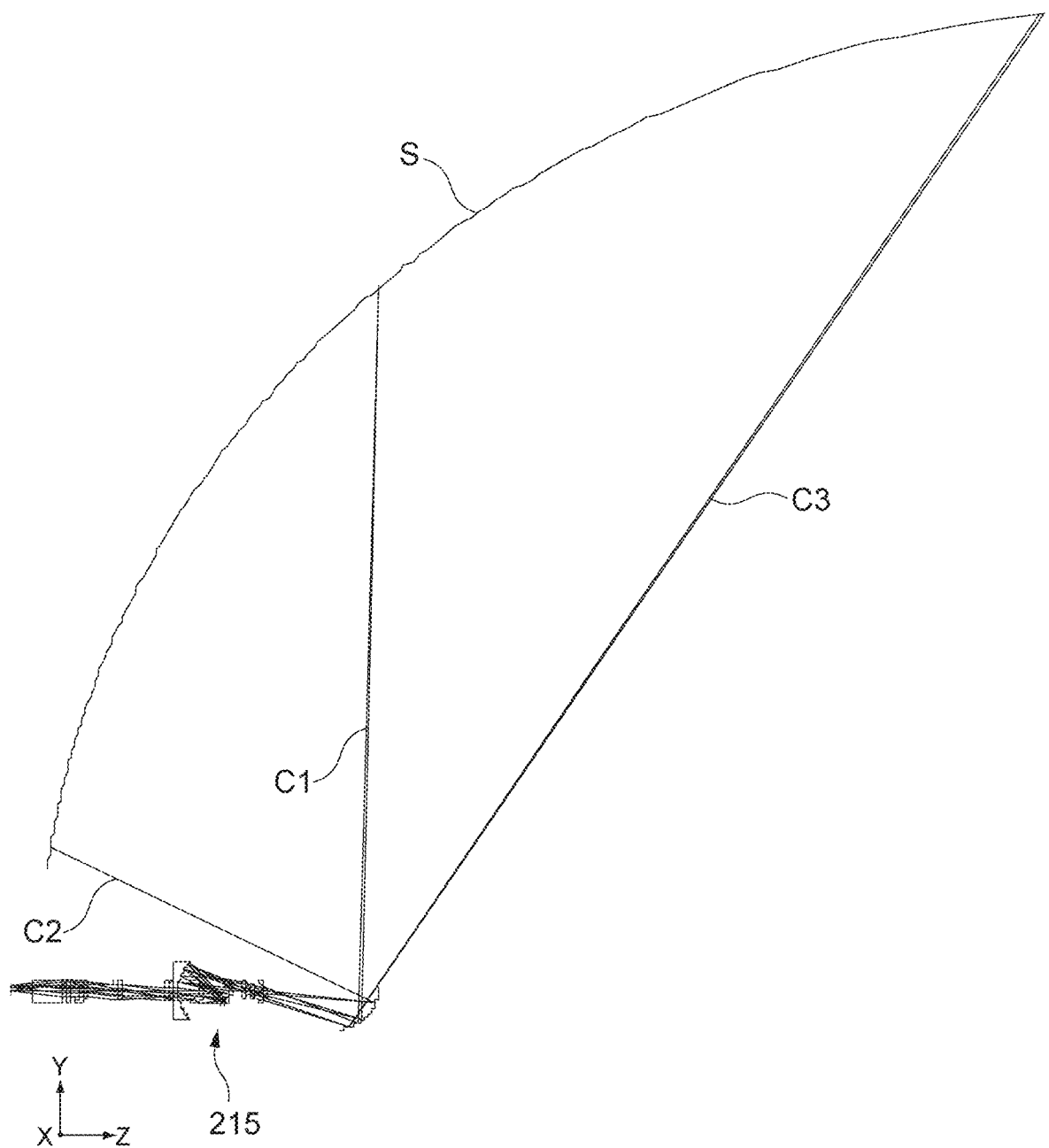
FIG. 22 is the optical path diagram showing the schematic configuration example of the projection optical system according to the second embodiment.

FIGS. 21 and 22 are optical path diagrams showing a schematic configuration example of a projection optical system 215 according to the second embodiment.

FIG. 23 shows lens data of the image display apparatus.

FIG. 24 is a table showing an example of the aspherical coefficients of the optical components included in the projection optical system.

Figures 25, 26:
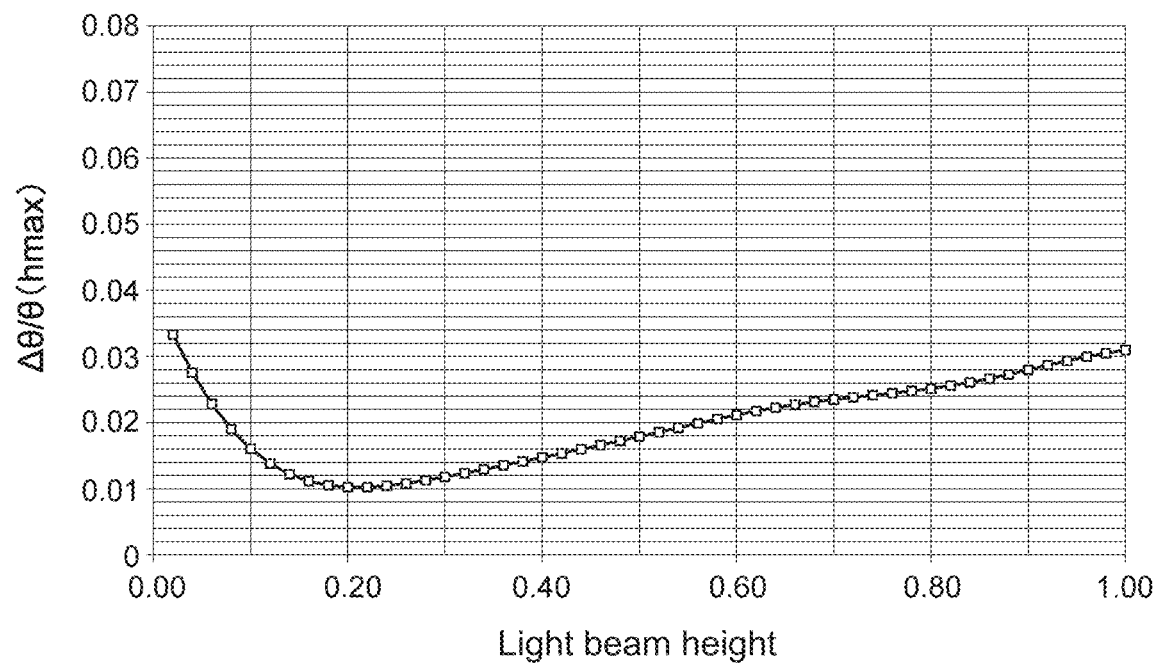
FIG. 25 is a graph showing a relationship between the light beam height h and the Δθ(h)/θ(hmax).
FIG. 26 is a table showing numerical values of the parameter used by the conditional expressions (1), (2), and (4).

FIG. 25 is a graph showing a relationship between the light beam height h and $\Delta\theta(h)/\theta(hmax)$.

Note that the parameters relating to the image projection are similar to those in the first embodiment and have the numerical values shown in FIG. 14.

Also, in the projection optical system 215 according to the present embodiment, the concave reflection surface Mr3, at least a portion of the light beams included in the image light incident on the concave reflection surface Mr3 is reflected in a direction intersecting at an angle of 90 degrees or more with a direction along the optical axis O as the reference axis.

Thus, it is possible to realize the high-quality image display corresponding to the curved screen S.

FIG. 26 is a table showing numerical values of the parameter used by the above-mentioned conditional expressions (1) (2), and (4) in the present embodiment.

$|Z'(1.0 \cdot h \max)Z'(0.9 \cdot h \max)| 0.003$ $|\Phi 2/\Phi 1| 0.356$ $|A+B|/C 1.003$ The result reveals that the conditional expressions (1), (2), and (4) are satisfied. The conditional expression (3) is also satisfied.

In the projection optical system 215 according to the present embodiment, all the Configuration conditions 1 to 6 are satisfied.

Thus, it is possible to improve the uniformity of the luminance and the magnification of the edge side region of the projection image and to realize the high-quality image display.

In the present embodiment, the conditional expression (4) is satisfied for the light beams emitted from the region from the image circle having the image height of 59% to the image circle (imc) having the maximum image height. Therefore, it is also possible to define the light beam as the high-image high-emission light beams.

Third Embodiment

Figure 27:
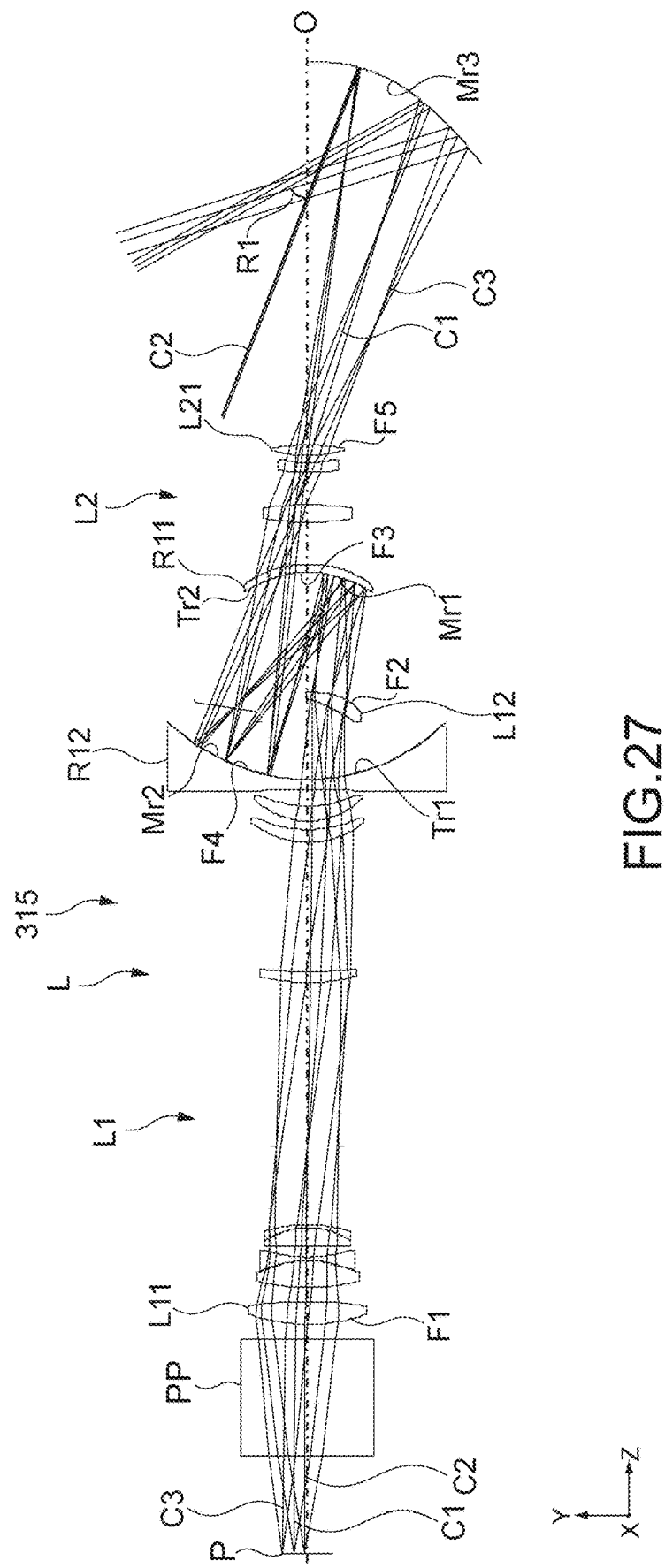
FIG. 27 is an optical path diagram showing a schematic configuration example of a projection optical system according to a third embodiment.
Figure 28:
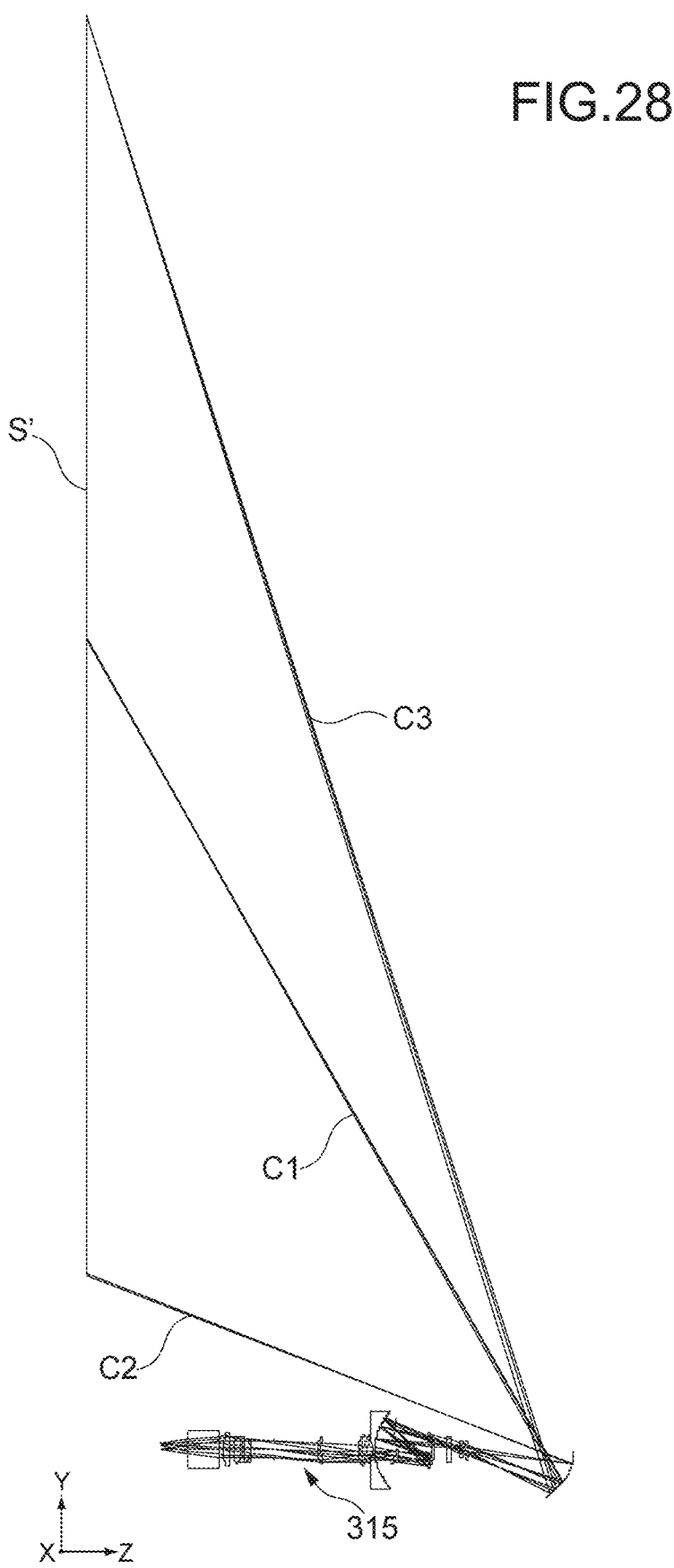
FIG. 28 is the optical path diagram showing the schematic configuration example of the projection optical system according to the third embodiment.

FIGS. 27 and 28 are optical path diagrams showing a schematic configuration example of a projection optical system 315 according to a third embodiment.

FIG. 29 is a table showing example of parameters relating to the image projection.

FIG. 30 shows lens data of the image display apparatus.

FIG. 31 is a table showing an example of the aspherical coefficients of the optical components included in the projection optical system.

Figures 32, 33:
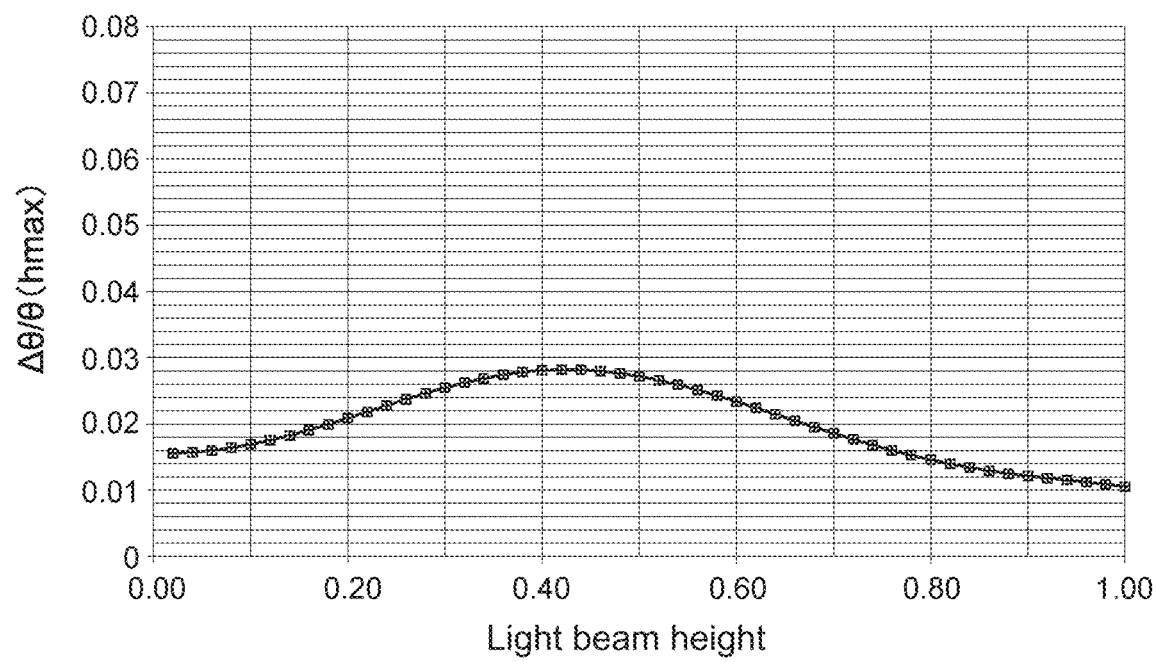
FIG. 32 is a graph showing a relationship between the light beam height h and the Δθ(h)/θ(hmax).
FIG. 33 is a table showing numerical values of the parameter used by the conditional expressions (1), (2), and (4).

FIG. 32 is a graph showing a relationship between the light beam height h and $\Delta\theta(h)/\theta(hmax)$.

In the present embodiment, the image light is projected to the flat screen S'.

The concave reflection surface Mr3 of the projection optical system 315 reflects the light beams included in the image light incident on the concave reflection surface Mr3 in a direction intersecting at an angle of less than 90 degrees with the direction along the optical axis O.

The present technology is also applicable to such an image display apparatus.

FIG. 33 is a table showing numerical values of the parameter used by the above-mentioned conditional expressions (1) (2), and (4) in the present embodiment.

$|Z'(1.0 \cdot h \max)Z'(0.9 \cdot h \max)| 0.002$ $|\Phi 2/\Phi 1| 0.455$ $|A+B|/C 0.972$ The result reveals that the conditional expressions (1), (2), and (4) are satisfied. The conditional expression (3) is also satisfied.

In the projection optical system 315 according to the present embodiment, all the Configuration conditions 1 to 6 are satisfied.

Thus, it is possible to improve the uniformity of the luminance and the magnification of the edge side region of the projection image and to realize the high-quality image display.

In the present embodiment, the conditional expression (4) is satisfied for the light beams included in a region having the reflection point reflected by the concave reflection surface Mr3 of larger than 0.82·hmax. Therefore, it is also possible to define the light beam as the high-image high-emission light beams.

In the present embodiment, the conditional expression (4) is satisfied for the light beams emitted from the region from the image circle having the image height of 71% to the image circle (imc) having the maximum image height. Therefore, it is also possible to define the light beam as the high-image high-emission light beams.

Fourth Embodiment

Figure 34:
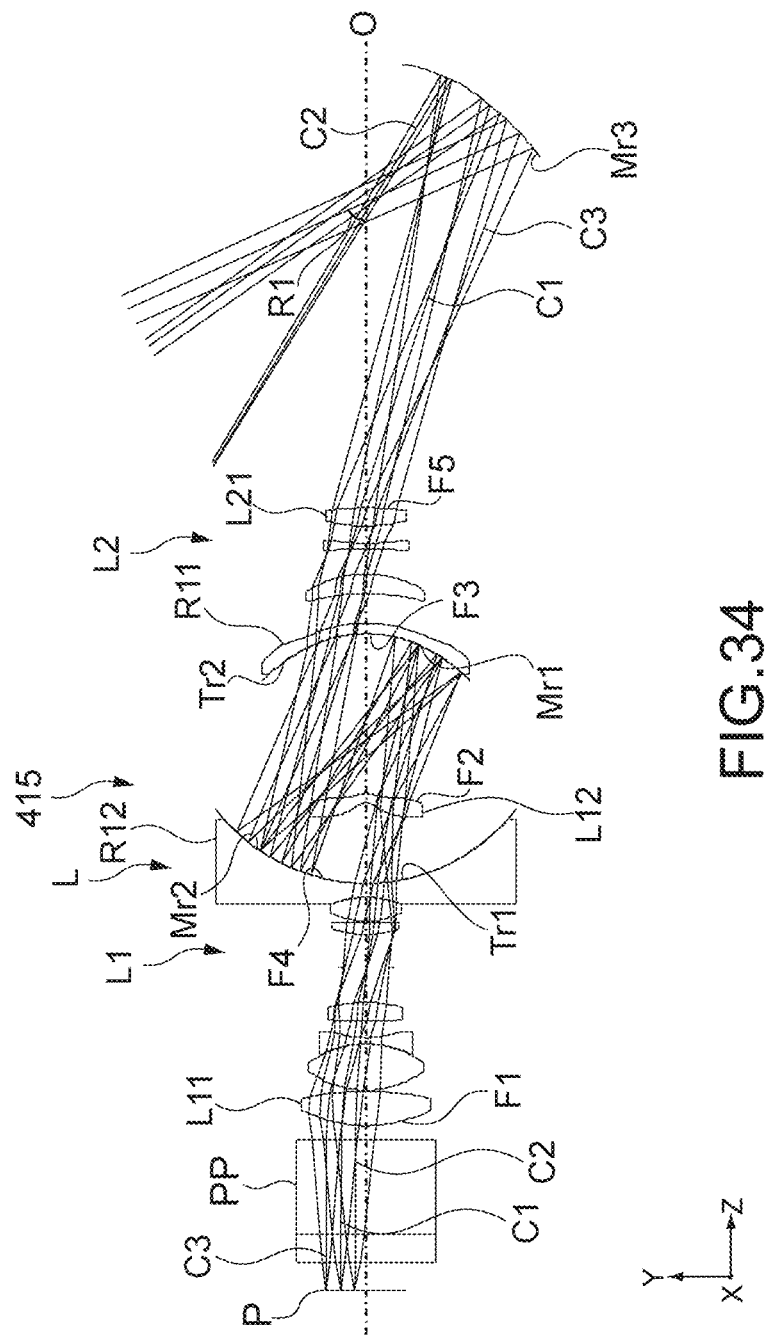
FIG. 34 is an optical path diagram showing a schematic configuration example of a projection optical system according to a fourth embodiment.
Figure 35:
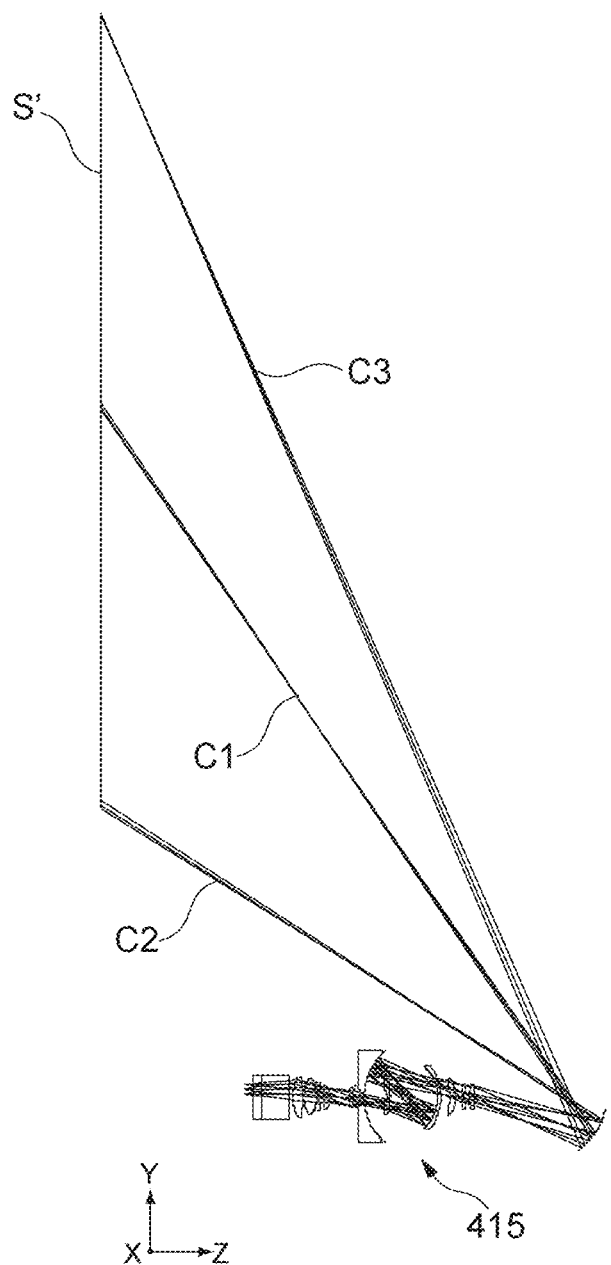
FIG. 35 is the optical path diagram showing the schematic configuration example of the projection optical system according to the fourth embodiment.

FIGS. 34 and 35 are optical path diagrams showing a schematic configuration example of a projection optical system 415 according to a fourth embodiment.

FIG. 36 is a table showing an example of parameters relating to the image projection.

FIG. 37 shows lens data of the image display apparatus.

FIG. 38 is a table showing an example of the aspherical coefficients of the optical components included in the projection optical system.

Figures 39, 40:
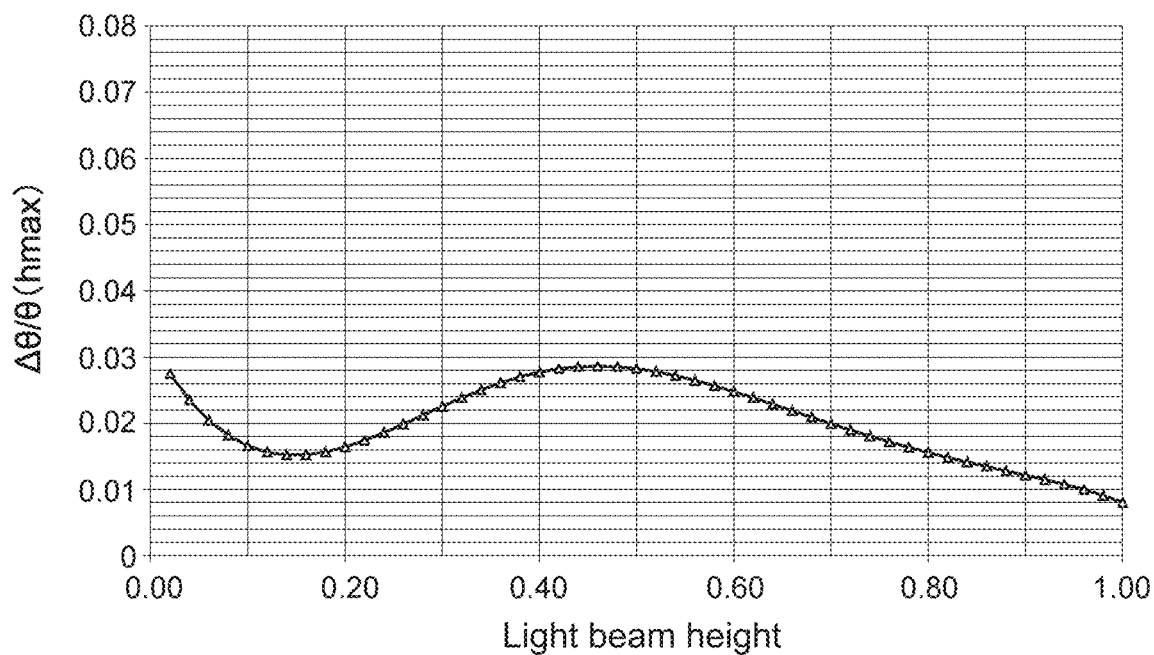
FIG. 39 is a graph showing a relationship between the light beam height h and Δθ(h)/θ(hmax).
FIG. 40 is a table showing numerical values of the parameter used by the conditional expressions (1), (2), and (4).

FIG. 39 is a graph showing a relationship between the light beam height h and $\Delta\theta(h)/\theta(hmax)$.

Also, in the present embodiment, the image light is projected to the flat screen S'.

The concave reflection surface Mr3 of the projection optical system 415 reflects the light beams included in the image light incident on the concave reflection surface Mr3 in a direction intersecting at an angle of less than 90 degrees with the direction along the optical axis O.

FIG. 40 is a table showing numerical values of the parameter used by the above-mentioned conditional expressions (1) (2), and (4) in the present embodiment.

$|Z'(1.0 \cdot h \max)-Z'(0.9 \cdot h \max)| 0.004$ $|\Phi 2/\Phi 1| 0.701$ $|A+B|/C 1.0388$ The result reveals that the conditional expressions (1), (2), and (4) are satisfied. The conditional expression (3) is also satisfied.

In the projection optical system 315 according to the present embodiment, all the Configuration conditions 1 to 6 are satisfied.

Thus, it is possible to improve the uniformity of the luminance and the magnification of the edge side region of the projection image and to realize the high-quality image display.

In the present embodiment, the conditional expression (4) is satisfied for the light beams included in a region having the reflection point reflected by the concave reflection surface Mr3 of larger than 0.78·hmax. Therefore, it is also possible to define the light beam as the high-image high-emission light beams.

OTHER EMBODIMENTS

The present technology is not limited to the embodiments described above and can achieve various other embodiments.

Figure 41:
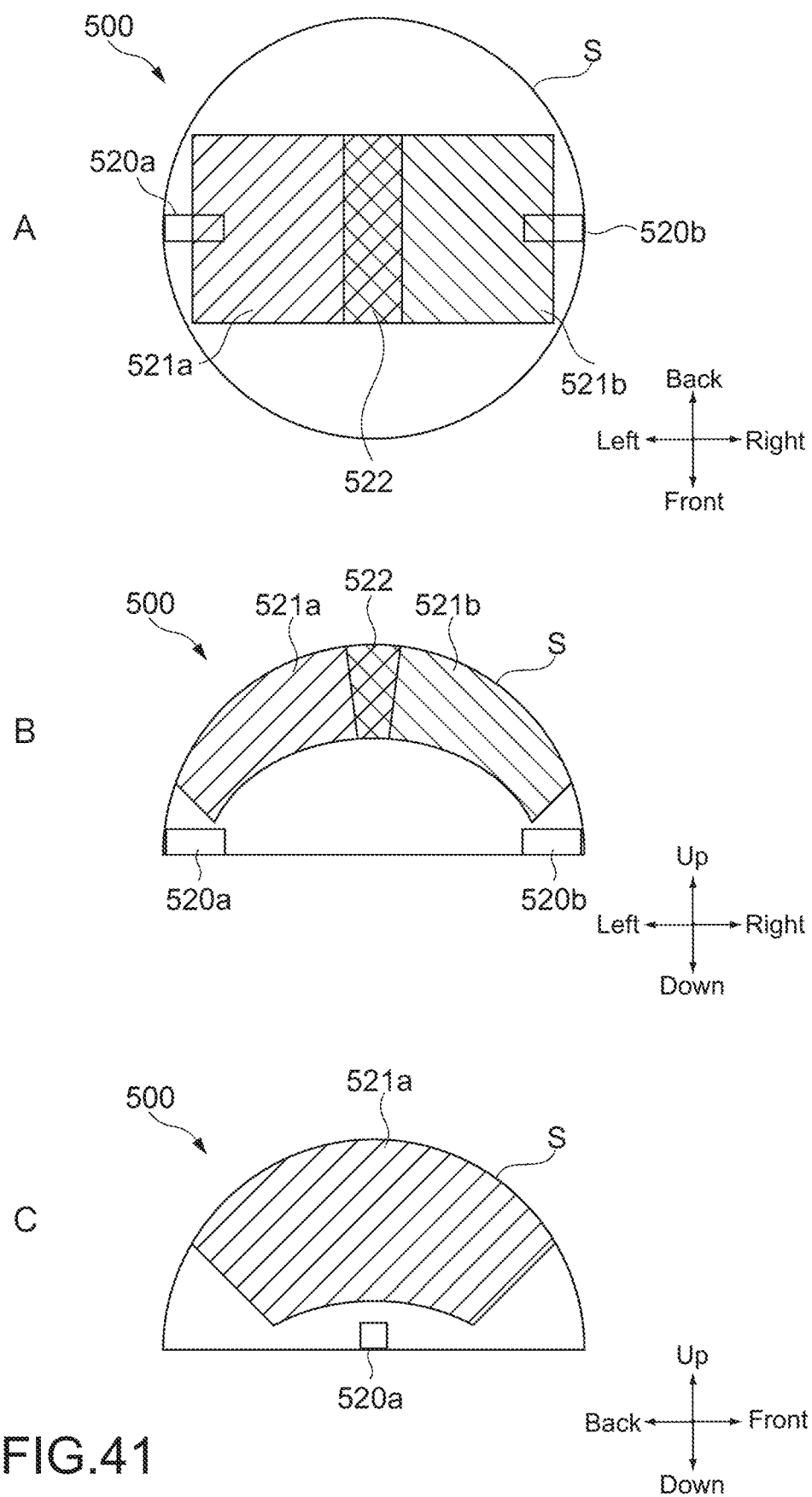
FIG. 41 is a schematic diagram showing a configuration example of an image display system according to another embodiment.

Each of FIGS. 41 and 42 is a schematic diagrams showing a configuration example of an image display system according to another embodiment.

In an image display system 500 shown in FIG. 41, a curved screen S having a dome shape is used. Note that the dome shape is not limited to a hemispherical shape and includes any shape capable of covering an upper portion around 360 degrees.

The curved screen S having the dome shape can also be referred to as a dome screen.

As shown in FIGS. 41A to C, the first and second image display apparatuses 520a and 520b are disposed below the dome shaped curved screen S so as to face each other along the right and left directions.

The first and second image display apparatuses 520a and 520b are installed such that the first and second images 521a and 521b can be projected upward.

The first and second images 521a and 521b are projected so as to overlap each other along the long side direction (left and right direction).

Accordingly, an overlapping region 522 in which the first and second images 521a and 521b overlap each other is generated at an apex portion of the curved screen S. The stitching process is performed on the basis of the overlapping region 522, and one image having a large size is displayed.

By using the image display apparatus according to the present technology described above as the first and second image display apparatuses 520a and 520b, the high-quality image display corresponding to the dome shape can be realized, and an excellent viewing environment can be provided.

Figure 42A:
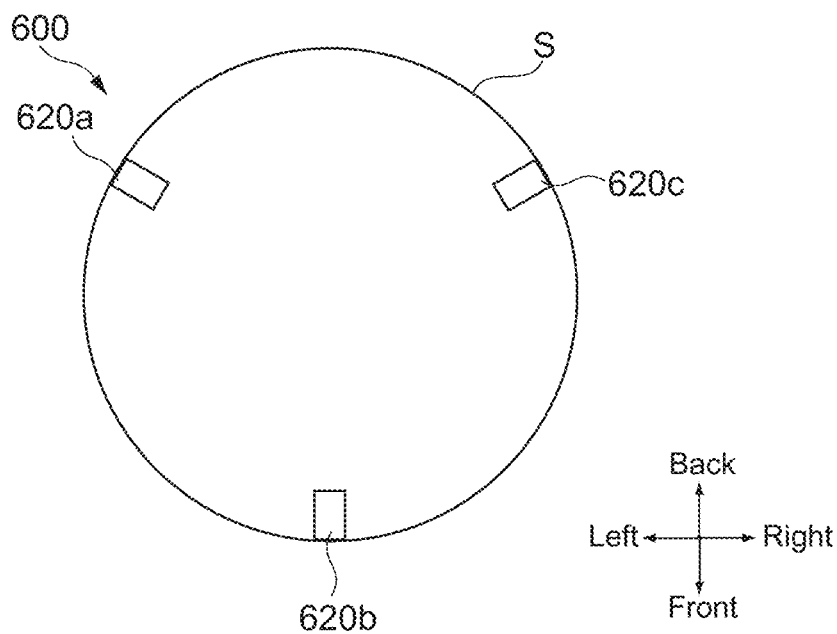
FIGS. 42A and 42B are schematic diagrams showing the configuration example of the image display system according to another embodiment.

In the image display system 600 shown in FIGS. 42A and 42B, first to third image display apparatuses 620a to 620b are arranged at equal spaces along a circumference below the dome shaped curved screen S.

The first to third image display apparatuses 620a to 620c are installed such that the first to third images 621a to 621c can be projected upward.

Figure 42B:
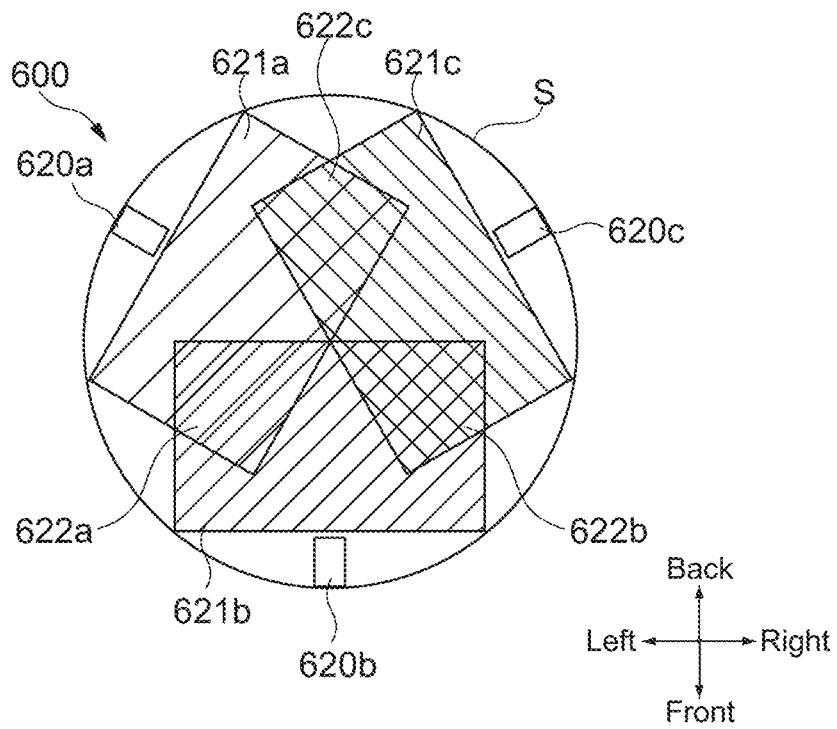

As shown in FIG. 42B, as the first to third images 621a to 621c, the image light for forming the rectangular image is projected.

As shown in FIG. 42B, each of the first to third images 621a to 621c is schematically shown in a rectangular shape, but the shape displayed on the curved screen S differs from the rectangular shape.

The first to third images 621a and 621b are projected so as to overlap each other at positions symmetrical to each other with respect to the apex of the curved screen S. Then, the stitching process is performed on the overlapping regions 622a to 622c, and one image having a large size is displayed.

By using the image display apparatuses according to the present technology described above as the first to third image display apparatuses 620a to 620c, the high-quality image display corresponding to the dome shape can be realized, and an excellent viewing environment can be provided.

As described above, the present technology is applicable even when three or more image display apparatuses are used.

As the concave reflection surface for reflecting image light on the screen, a free curved surface having no rotational symmetrical axis may be used.

In this case, for example, the optical axis of the concave reflection surface (e.g., axis passing through center of optical surface) is aligned with the reference axis serving as a reference in constituting the lens system. This makes it possible to exhibit the similar effect as described above.

Also, for each of the first reflection surface and the second reflection surface, a free curved surface having no rotational symmetrical axis may be used. That is, at least one of the concave reflection surface, the first reflection surface, or the second reflection surface may be the free curved surface having no rotational symmetrical axis.

The object to be projected is not limited to the curved screen. The present technology is applicable to the image display on an arbitrary object to be projected, such as a wall of a table, a building, or the like. Especially, the high-quality image display corresponding to the object to be projected having the curved shape can be realized.

Each configuration of the image display system, the image display apparatus, the projection optical system, the concave reflection surface, the screen, and the like described with reference to the drawings is merely one embodiment, and can be arbitrarily modified without departing from the scope of the present technology. In other words, for example, any other configurations or algorithms for practicing the present technology may be adopted.

When the term "approximately" is used in the present disclosure, it is used merely to facilitate understanding of the description, and the use/non-use of the term "approximately" is not particularly meaningful.

That is, in the present disclosure, a concept of specifying a shape, a size, a contrast relationship, a positional relationship, a state, and the like, such as "center," "central," "uniform," "coincide," "equal," "same," "orthogonal," "parallel," "extending," "axial," "cylindrical," "columnar," "ring shape," "annular shape," or the like is a concept including "substantially center," "substantially central," "substantially uniform," "substantially coincide," "substantially equal," "substantially same," "substantially orthogonal," "substantially parallel," "substantially extending," "substantially axial," "substantially cylindrical," "substantially columnar," "substantially ring shape," "substantially annular shape," or the like.

For example, it also includes states included in a predetermined range (e.g., ±10% range) based on "perfect center," "perfect central," "perfect uniform," "perfect coincide,"

"perfect equal," "perfect same," "perfect orthogonal," "perfect parallel," "perfect extending," "perfect axial," "perfect cylindrical," "perfect columnar," "perfect ring shape," "perfect annular shape," or the like.

Therefore, even when the word "approximately" is not added, a concept expressed by adding a so called "approximately" may be included. On the contrary, the complete state is not excluded for the state represented by the addition of "approximately".

In the present disclosure, an expression using "than" such as "larger than A" and "smaller than A" is an expression comprehensively including both a concept including a case where the expression is equivalent to A and a concept including a case where the expression is not equivalent to A. For example, the "larger than A" is not limited to the case where it does not include the equivalent to A, and includes "larger than or equal to A". The "smaller than A" is not limited to "smaller than A" and includes "smaller than or equal to A".

When the present technology is implemented, specific settings and the like may be appropriately adopted from the concepts included in "larger than A" and "smaller than A" such that the effects described above are exhibited.

At least two of the features of the present technology described above can also be combined. In other words, various features described in the respective embodiments may be combined discretionarily regardless of the embodiments. Furthermore, the various effects described above are not limitative but are merely illustrative, and other effects may be provided.

Note that the present technology may also take the following configurations.

(1) An image display apparatus, including:
    a light source;
    an image generation unit for generating image light by modulating light emitted from the light source; and
    a projection optical system having
        a lens system configured with reference to a reference axis at a position where the generated image light is incident and having a positive refractive power as a whole, and
        a concave reflection surface configured with reference to the reference axis and reflecting the image light emitted from the lens system toward an object to be projected;
    in which a relationship $0<|\Delta\theta(h\mathrm{max})-\Delta\theta(0.9\cdot h\mathrm{max})|/\theta(h\mathrm{max})<0.056$ is satisfied if
        a light beam height from the reference axis is denoted as h,
        an angle with respect to an optical axis height direction of a tangent line of a function Z(h) representing a shape of the concave reflection surface corresponding to the light beam height h is denoted as $\theta(h)$,
        an amount of change in the angle $\theta(h)$ at the light beam height h is denoted as $\Delta\theta(h)$, and
        the light beam height h of a reflection point farthest from the reference axis of the concave reflection surface for reflecting the image light is denoted as hmax.
(2) The image display apparatus according to (1), in which the $\Delta\theta(h)$ is $\theta(h)-\theta(0.98\cdot h)$.
(3) The image display apparatus according to (1) or (2), in which
    if light beams of the image light included in a region having a reflection point reflected by the concave reflection surface of larger than 0.85·hmax are denoted as edge side light beams,
    the projection optical system is configured such that the traveling directions of each of the edge side light beams incident on the concave reflection surface are parallel to each other.
(4) The image display apparatus according to (3), in which
    the projection optical system is configured such that light beam spaces of the edge side light beams incident on the concave reflection surface are equal.
(5) The image display apparatus according to any one of (1) to (4), in which
    the lens system has
        a first refractive optical system having a positive refractive power as a whole and refracting the image light generated,
        a first reflection surface for reflecting back the image light refracted by the first refractive optical system,
        a second reflection surface for reflecting back the image light reflected by the first reflection surface, and
        a second refractive optical system having a positive refractive power as a whole and refracting the image light reflected by the second reflection surface to emit to the concave reflection surface, in which a relationship $0.1<|\Phi2/\Phi1|<1.2$ is satisfied if
        a power of the first reflection surface is denoted as $\Phi1$, and
        a power of the second reflection surface is denoted as $\Phi2$.
(6) The image display apparatus according to (5), in which a relationship $|\Phi2|<|\Phi1|$ is satisfied.
(7) The image display apparatus according to (5) or (6), in which
    if the first refractive optical system, the first reflection surface, and the second reflection surface are denoted as a first optical system, and a portion acting on the edge side light beams of the second refractive optical system is denoted as a second optical system,
    the first optical system condenses the edge side light beams on a predetermined condensing position, and
    the predetermined condensing position coincides with a front focus position of the second optical system.
(8) The image display apparatus according to (7), in which a relationship $0.8<|A+B|/C<1.2$ is satisfied if
        among the edge side light beams, a light beam having the light beam height at the reflection point reflected by the concave reflection surface being an intermediate value is denoted as an intermediate light beam,
        an incident position of the intermediate light beam with respect to a final lens surface of the second refractive optical system is denoted as an intermediate incident position,
        an optical path length of the intermediate light beam from the image generation unit to the predetermined condensing position is denoted as A,
        an optical path length from the intermediate incident position to the front focus position is denoted as B, and an optical path length of the intermediate light beam from the image generation unit to the intermediate incident position is denoted as C.

(9) The image display apparatus according to (8), in which
if an average value of an angle in which each traveling direction of the edge side light beams incident on the concave reflection surface and a direction along the reference axis are intersected is denoted as an average angle, and
a region on which the edge side light beams are incident of the final lens surface of the second refractive optical system is denoted as an edge side incident region,
the front focus position of the second optical system is a condensing position when a parallel beam is incident on the edge side incident region of the final lens surface from an opposite side along the direction intersecting at the average angle with respect to the direction along the reference axis.

(10) The image display apparatus according to (9), in which
the optical path length B is an optical path length of the light beam traveling from the intermediate incident position to the back focus position if the parallel light beam is incident on the edge side incident region of the final lens surface from an opposite side.

(11) The image display apparatus according to any one of (1) to (10), in which
the concave reflection surface reflects at least a portion of the light beams included in the image light incident on the concave reflection surface in a direction intersecting at an angle of 90 degrees or more with a direction along the reference axis.

(12) The image display apparatus according to any one of (1) to (11), in which
the projection optical system includes a first optical component where one region of a main surface is configured as the first reflection surface and the other region of the main surface is configured as a transmission surface, and
the transmission surface of the first optical component functions as the second refractive optical system.

(13) The image display apparatus according to any one of (1) to (12), in which
the projection optical system includes a second optical component where one region of a main surface is configured as the second reflection surface and the other region of the main surface is configured as a transmission surface, and
the transmission surface of the second optical component functions as the first refractive optical system.

(14) The image display apparatus according to any one of (1) to (13), in which
the reference axis is an axis obtained by extending an optical axis of a lens closest to the image generation unit included in the lens system.

(15) The image display apparatus according to any one of (1) to (14), in which
the projection optical system is configured such that an optical axis of each of all optical components included in the projection optical system coincides with a predetermined reference axis.

(16) The image display apparatus according to any one of (1) to (15), in which
the concave reflection surface is configured such that a rotational symmetrical axis coincides with the reference axis, and
each of the first reflection surface and the second reflection surface is a concave reflection surface and is configured such that the rotational symmetrical axis coincides with the reference axis.

(17) The image display apparatus according to any one of (1) to (15), in which
each of the concave reflection surface, the first reflection surface, and the second reflection surface is configured such that an optical axis coincides with the reference axis, and
at least one of the concave reflection surface, the first reflection surface, or the second reflection surface is a free curved surface having no rotational symmetrical axis.

(18) The image display apparatus according to any one of (1) to (17), in which
the object to be projected is a flat screen or a curved screen.

(19) The image display apparatus according to any one of (1) to (17), in which
the projection object is a screen having a dome shape.

(20) A projection optical system for projecting image light generated by modulating light emitted from a light source, including:
a lens system configured with reference to a reference axis at a position where the generated image light is incident and having a positive refractive power as a whole; and
a concave reflection surface configured with reference to the reference axis and reflecting the image light emitted from the lens system toward an object to be projected;
in which a relationship $$0 < |\Delta\theta(h\text{max}) - \Delta\theta(0.9 \cdot h\text{max})| / \theta(h\text{max}) < 0.056$$

is satisfied if
a light beam height from the reference axis is denoted as h,
an angle with respect to an optical axis height direction of a tangent line of a function Z(h) representing a shape of the concave reflection surface corresponding to the light beam height h is denoted as $\theta(h)$,
an amount of change in the angle $\theta(h)$ at the light beam height h is denoted as $\Delta\theta(h)$, and
the light beam height h of a reflection point farthest from the reference axis of the concave reflection surface for reflecting the image light is denoted as hmax.

REFERENCE SIGNS LIST

CE edge side light beam
C1 to C3 pixel light
F5 final lens surface
L1 first refractive optical system
L2 second refractive optical system
LL1 first optical system
LL2 second optical system
Mr1 first reflection surface
Mr2 second reflection surface
Mr3 concave reflection surface
O optical axis
S' flat screen
1 liquid crystal projector
5 light source
10 lighting optical system
15, 215, 315, 415 projection optical system
20, 520, 620 image display apparatus
30, S curved screen
35 condensing position
36 front focus position
37 edge side incident region 38 parallel beam
40 intermediate light beam
41 intermediate incident position
100, 500, 600 image display system

What is claimed is:

1. An image display apparatus, comprising:
a light source;
an image generation unit for generating image light by modulating light emitted from the light source; and
a projection optical system having
a lens system configured with reference to a reference axis at a position where the generated image light is incident and having a positive refractive power as a whole, and
a concave reflection surface configured with reference to the reference axis and reflecting the image light emitted from the lens system toward an object to be projected;
wherein a relationship $$0 < |\Delta\theta(h\mathrm{max}) - \Delta\theta(0.9 \cdot h\mathrm{max})|/\theta(h\mathrm{max}) < 0.056$$

is satisfied if
a light beam height from the reference axis is denoted as h,
an angle with respect to an optical axis height direction of a tangent line of a function Z(h) representing a shape of the concave reflection surface corresponding to the light beam height h is denoted as $\theta(h)$,
an amount of change in the angle $\theta(h)$ at the light beam height h is denoted as $\Delta\theta(h)$, and
the light beam height h of a reflection point farthest from the reference axis of the concave reflection surface for reflecting the image light is denoted as hmax.

2. The image display apparatus according to claim 1, wherein
the $\Delta\theta(h)$ is $\theta(h) - \theta(0.98 \cdot h)$.

3. The image display apparatus according to claim 1, wherein
if light beams of the image light included in a region having a reflection point reflected by the concave reflection surface of larger than 0.85·hmax are denoted as edge side light beams,
the projection optical system is configured such that traveling directions of each of the edge side light beams incident on the concave reflection surface are parallel to each other.

4. The image display apparatus according to claim 3, wherein
the projection optical system is configured such that light beam spaces of the edge side light beams incident on the concave reflection surface are equal.

5. The image display apparatus according to claim 1, wherein
the lens system has
a first refractive optical system having a positive refractive power as a whole and refracting the image light generated,
a first reflection surface for reflecting back the image light refracted by the first refractive optical system,
a second reflection surface for reflecting back the image light reflected by the first reflection surface, and
a second refractive optical system having a positive refractive power as a whole and refracting the image light reflected by the second reflection surface to emit to the concave reflection surface, wherein a relationship
$0.1 < |\Phi 2/\Phi 1| < 1.2$
is satisfied if a power of the first reflection surface is denoted as $\Phi 1$, and
a power of the second reflection surface is denoted as $\Phi 2$.

6. The image display apparatus according to claim 5, wherein a relationship $$|\Phi 2| < |\Phi 1|$$

is satisfied.

7. The image display apparatus according to claim 5, wherein
if the first refractive optical system, the first reflection surface, and the second reflection surface are denoted as a first optical system, and a portion acting on edge side light beams of the second refractive optical system is denoted as a second optical system,
the first optical system condenses the edge side light beams on a predetermined condensing position, and
the predetermined condensing position coincides with a front focus position of the second optical system.

8. The image display apparatus according to claim 7, wherein a relationship $$0.8 < |A+B|/C < 1.2$$

is satisfied if
among the edge side light beams, a light beam having the light beam height at the reflection point reflected by the concave reflection surface being an intermediate value is denoted as an intermediate light beam,
an incident position of the intermediate light beam with respect to a final lens surface of the second refractive optical system is denoted as an intermediate incident position,
an optical path length of the intermediate light beam from the image generation unit to the predetermined condensing position is denoted as A,
an optical path length from the intermediate incident position to the front focus position is denoted as B, and
an optical path length of the intermediate light beam from the image generation unit to the intermediate incident position is denoted as C.

9. The image display apparatus according to claim 8, wherein
if an average value of an angle in which each traveling direction of the edge side light beams incident on the concave reflection surface and a direction along the reference axis are intersected is denoted as an average angle, and
a region on which the edge side light beams are incident of the final lens surface of the second refractive optical system is denoted as an edge side incident region,
the front focus position of the second optical system is a condensing position when a parallel light beam is incident on the edge side incident region of the final lens surface from an opposite side along the direction intersecting at the average angle with respect to the direction along the reference axis.

10. The image display apparatus according to claim 9, wherein
the optical path length B is an optical path length of the light beam traveling from the intermediate incident position to a back focus position if the parallel light beam is incident on the edge side incident region of the final lens surface from an opposite side.

11. The image display apparatus according to claim 1, wherein
the concave reflection surface reflects at least a portion of the light beams included in the image light incident on the concave reflection surface in a direction intersecting at an angle of 90 degrees or more with a direction along the reference axis.

12. The image display apparatus according to claim 1, wherein
the projection optical system includes a first optical component where one region of a main surface is configured as a first reflection surface and another region of the main surface is configured as a transmission surface, and
the transmission surface of the first optical component functions as a second refractive optical system.

13. The image display apparatus according to claim 12, wherein
the projection optical system includes a second optical component where one region of a main surface is configured as a second reflection surface and another region of the main surface is configured as a transmission surface, and
the transmission surface of the second optical component functions as a first refractive optical system.

14. The image display apparatus according to claim 1, wherein
the reference axis is an axis obtained by extending an optical axis of a lens closest to the image generation unit included in the lens system.

15. The image display apparatus according to claim 1, wherein
the projection optical system is configured such that an optical axis of each of all optical components included in the projection optical system coincides with a predetermined reference axis.

16. The image display apparatus according to claim 5, wherein
the concave reflection surface is configured such that a rotational symmetrical axis coincides with the reference axis, and
each of the first reflection surface and the second reflection surface is a concave reflection surface and is configured such that the rotational symmetrical axis coincides with the reference axis.

17. The image display apparatus according to claim 5, wherein
each of the concave reflection surface, the first reflection surface, and the second reflection surface is configured such that an optical axis coincides with the reference axis, and
at least one of the concave reflection surface, the first reflection surface, or the second reflection surface is a free curved surface having no rotational symmetrical axis.

18. The image display apparatus according to claim 1, wherein
the object to be projected is a flat screen or a curved screen.

19. The image display apparatus according to claim 1, wherein
the projection object is a screen having a dome shape.

20. A projection optical system for projecting image light generated by modulating light emitted from a light source, comprising:
a lens system configured with reference to a reference axis at a position where the generated image light is incident and having a positive refractive power as a whole; and
a concave reflection surface configured with reference to the reference axis and reflecting the image light emitted from the lens system toward an object to be projected;
wherein a relationship $$0 < |\Delta\theta(h\mathrm{max}) - \Delta\theta(0.9 \cdot h\mathrm{max})| / \theta(h\mathrm{max}) < 0.056$$

is satisfied if
a light beam height from the reference axis is denoted as h,
an angle with respect to an optical axis height direction of a tangent line of a function Z(h) representing a shape of the concave reflection surface corresponding to the light beam height h is denoted as $\theta(h)$,
an amount of change in the angle $\theta(h)$ at the light beam height h is denoted as $\Delta\theta(h)$, and
the light beam height h of a reflection point farthest from the reference axis of the concave reflection surface for reflecting the image light is denoted as hmax.

* * * * *